(12) United States Patent
Raghavan et al.

(10) Patent No.: US 12,401,403 B2
(45) Date of Patent: Aug. 26, 2025

(54) ANTENNA GROUP-SPECIFIC PARAMETER CONFIGURATION IN MILLIMETER WAVE COMMUNICATIONS

(71) Applicant: QUALCOMM Incorporated, San Diego, CA (US)

(72) Inventors: Vasanthan Raghavan, West Windsor Township, NJ (US); Tao Luo, San Diego, CA (US); Junyi Li, Franklin Park, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/156,767

(22) Filed: Jan. 25, 2021

(65) Prior Publication Data

US 2021/0234598 A1 Jul. 29, 2021

Related U.S. Application Data

(60) Provisional application No. 62/966,498, filed on Jan. 27, 2020.

(51) Int. Cl.
*H04B 7/02* (2018.01)
*H04B 7/06* (2006.01)
*H04W 52/14* (2009.01)

(52) U.S. Cl.
CPC ........ *H04B 7/0639* (2013.01); *H04W 52/146* (2013.01)

(58) Field of Classification Search
CPC .. H04B 7/0639; H04B 7/0456; H04B 7/0691; H04W 52/146; H04W 52/247; H04W 52/42
(Continued)

(56) References Cited

U.S. PATENT DOCUMENTS 6,002,360 A 12/1999 Wolcott et al.
7,787,554 B1 8/2010 Nabar et al.
(Continued)

FOREIGN PATENT DOCUMENTS

CN 1761182 A 4/2006
CN 201902262 U 7/2011
(Continued)

OTHER PUBLICATIONS

CATT: "Consideration on Multi-Beam Enhancements", 3GPP Draft; 3GPP TSG RAN WG1 Meeting #98, R1-1908603, 3rd Generation Partnership Project (3GPP), Mobile Competence Centre; 650, Route Des Lucioles; F-06921 Sophia-Antipolis Cedex; France, vol. RAN WG1, No. Prague, CZ; Aug. 26, 2019-Aug. 30, 2019, Aug. 17, 2019 (Aug. 17, 2019), XP051765211, 7 Pages, Retrieved from the Internet: URL: http://www.3gpp.org/ftp/tsg_ran/WG1_RL1/TSGR1_98/Docs/R1-1908603.zip [retrieved on Aug. 17, 2019], chapter 3; pp. 3,4, p. 2, paragraph section 2.1—p. 3, paragraph section 2.2.
(Continued)

*Primary Examiner* — Helene E Tayong
(74) *Attorney, Agent, or Firm* — Holland & Hart LLP / QUALCOMM Incorporated

(57) ABSTRACT

Methods, systems, and devices for wireless communications are described in which a first wireless device, such as a user equipment (UE), may select a set of different groups of antenna elements that are preferred for use in millimeter wave communications at the first wireless device. The first wireless device may provide one or more parameters to a second wireless device that indicates a number of antenna elements of one or more of the groups of antenna elements that is used to determine one or more transmission control parameters. The second wireless device may determine one or more transmission control parameters based on the indicated parameters and number of antenna elements, which
(Continued)

may be used for communications with the first wireless device.

40 Claims, 17 Drawing Sheets

(58) Field of Classification Search
USPC .......................................................... 375/267
See application file for complete search history.

(56) References Cited

U.S. PATENT DOCUMENTS

| | | | |
|---|---|---|---|
| 7,826,415 | B2 | 11/2010 | Oh et al. |
| 8,503,322 | B2 | 8/2013 | Krishnamurthy et al. |
| 9,312,933 | B2 | 4/2016 | Zhang et al. |
| 9,363,683 | B2 | 6/2016 | Raghavan et al. |
| 9,509,382 | B1 | 11/2016 | Nabar et al. |
| 9,520,973 | B2 * | 12/2016 | Kim ..................... H04B 7/0891 |
| 9,780,928 | B2 | 10/2017 | Moshfeghi |
| 9,806,777 | B1 | 10/2017 | Doostnejad et al. |
| 10,004,032 | B2 | 6/2018 | Islam et al. |
| 10,075,223 | B1 | 9/2018 | Pawar et al. |
| 10,425,878 | B2 | 9/2019 | Cezanne et al. |
| 10,425,901 | B2 | 9/2019 | Islam et al. |
| 10,462,796 | B2 | 10/2019 | Frenne et al. |
| 10,559,880 | B1 | 2/2020 | Garrett et al. |
| 10,574,321 | B2 | 2/2020 | Nilsson et al. |
| 10,826,585 | B2 | 11/2020 | Bolotin et al. |
| 10,841,914 | B2 | 11/2020 | Liou et al. |
| 10,879,627 | B1 | 12/2020 | Frigon et al. |
| 10,924,173 | B2 | 2/2021 | Bai et al. |
| 10,986,235 | B2 | 4/2021 | Seo et al. |
| 11,438,877 | B2 | 9/2022 | Luo et al. |
| 2006/0008275 | A1 * | 1/2006 | Lacovara ................ H04B 13/00 398/140 |
| 2006/0039318 | A1 | 2/2006 | Oh et al. |
| 2007/0070927 | A1 | 3/2007 | Shoki et al. |
| 2008/0240208 | A1 | 10/2008 | Lou et al. |
| 2011/0069633 | A1 | 3/2011 | Schmidt et al. |
| 2011/0255434 | A1 | 10/2011 | Ylitalo |
| 2012/0015603 | A1 | 1/2012 | Proctor, Jr. et al. |
| 2012/0064841 | A1 | 3/2012 | Husted et al. |
| 2012/0140658 | A1 | 6/2012 | Kanzaki et al. |
| 2014/0011468 | A1 | 1/2014 | Park et al. |
| 2014/0206304 | A1 | 7/2014 | Zhang et al. |
| 2014/0235287 | A1 | 8/2014 | Maltsev et al. |
| 2014/0241446 | A1 | 8/2014 | Zhang et al. |
| 2014/0294111 | A1 | 10/2014 | Zhang et al. |
| 2014/0363166 | A1 * | 12/2014 | Lacovara ................ H04B 10/80 398/104 |
| 2015/0092621 | A1 | 4/2015 | Jalloul et al. |
| 2015/0349863 | A1 | 12/2015 | El Ayach et al. |
| 2016/0020876 | A1 | 1/2016 | Raghavan et al. |
| 2016/0044517 | A1 | 2/2016 | Raghavan et al. |
| 2016/0112173 | A1 * | 4/2016 | Wang ..................... H04L 5/0053 370/329 |
| 2016/0242182 | A1 | 8/2016 | Chen et al. |
| 2017/0005958 | A1 | 1/2017 | Frenkel et al. |
| 2017/0013630 | A1 | 1/2017 | Franz et al. |
| 2017/0117947 | A1 | 4/2017 | Petersson et al. |
| 2017/0164226 | A1 | 6/2017 | Wei et al. |
| 2017/0194706 | A1 | 7/2017 | Lee et al. |
| 2017/0195998 | A1 | 7/2017 | Zhang et al. |
| 2017/0294926 | A1 | 10/2017 | Islam et al. |
| 2017/0359826 | A1 | 12/2017 | Islam et al. |
| 2017/0364819 | A1 | 12/2017 | Yang |
| 2018/0062720 | A1 | 3/2018 | Islam et al. |
| 2018/0063693 | A1 | 3/2018 | Chakraborty et al. |
| 2018/0138962 | A1 | 5/2018 | Islam et al. |
| 2018/0227094 | A1 | 8/2018 | Liu et al. |
| 2018/0227772 | A1 | 8/2018 | Yu et al. |
| 2018/0249453 | A1 | 8/2018 | Nagaraja et al. |
| 2018/0249526 | A1 | 8/2018 | Nagaraja et al. |
| 2018/0278309 | A1 | 9/2018 | Raghavan et al. |
| 2018/0278316 | A1 | 9/2018 | Yang et al. |
| 2018/0278320 | A1 | 9/2018 | Chendamarai et al. |
| 2019/0044596 | A1 | 2/2019 | Bolotin et al. |
| 2019/0053220 | A1 | 2/2019 | Zhang et al. |
| 2019/0059056 | A1 | 2/2019 | Islam et al. |
| 2019/0069198 | A1 | 2/2019 | Gheorghiu et al. |
| 2019/0081691 | A1 | 3/2019 | Nagaraja et al. |
| 2019/0081753 | A1 | 3/2019 | Jung et al. |
| 2019/0103908 | A1 | 4/2019 | Yu et al. |
| 2019/0141552 | A1 | 5/2019 | Chen et al. |
| 2019/0150161 | A1 | 5/2019 | Cheng et al. |
| 2019/0174385 | A1 | 6/2019 | Sang et al. |
| 2019/0190582 | A1 | 6/2019 | Guo et al. |
| 2019/0239092 | A1 | 8/2019 | Zhou et al. |
| 2019/0268118 | A1 | 8/2019 | Sadiq et al. |
| 2019/0349058 | A1 | 11/2019 | Raghavan et al. |
| 2019/0349863 | A1 | 11/2019 | Lim et al. |
| 2019/0393948 | A1 | 12/2019 | Zhao et al. |
| 2020/0015106 | A1 | 1/2020 | Lane et al. |
| 2020/0028545 | A1 | 1/2020 | Koskela et al. |
| 2020/0029274 | A1 | 1/2020 | Cheng et al. |
| 2020/0059280 | A1 | 2/2020 | Thurfjell et al. |
| 2020/0068644 | A1 | 2/2020 | Zhou et al. |
| 2020/0091978 | A1 | 3/2020 | Noh et al. |
| 2020/0136708 | A1 | 4/2020 | Pan et al. |
| 2020/0145079 | A1 | 5/2020 | Marinier et al. |
| 2020/0145929 | A1 | 5/2020 | Ryu et al. |
| 2020/0178134 | A1 | 6/2020 | Yang et al. |
| 2020/0178261 | A1 | 6/2020 | Ioffe et al. |
| 2020/0220603 | A1 | 7/2020 | Hao et al. |
| 2020/0220631 | A1 | 7/2020 | Onggosanusi et al. |
| 2020/0228190 | A1 | 7/2020 | Cirik et al. |
| 2020/0259618 | A1 | 8/2020 | Yang et al. |
| 2020/0259703 | A1 | 8/2020 | Cirik et al. |
| 2020/0260300 | A1 | 8/2020 | Cirik et al. |
| 2020/0314906 | A1 | 10/2020 | Goyal et al. |
| 2020/0351798 | A1 | 11/2020 | Ji et al. |
| 2020/0358509 | A1 | 11/2020 | Wernersson et al. |
| 2020/0366348 | A1 | 11/2020 | Bolotin et al. |
| 2020/0367083 | A1 | 11/2020 | Hao et al. |
| 2020/0374806 | A1 | 11/2020 | Manolakos et al. |
| 2020/0374960 | A1 | 11/2020 | Deenoo et al. |
| 2020/0383060 | A1 | 12/2020 | Park et al. |
| 2021/0021325 | A1 | 1/2021 | Davydov et al. |
| 2021/0022094 | A1 | 1/2021 | Luo et al. |
| 2021/0036741 | A1 | 2/2021 | Park et al. |
| 2021/0050898 | A1 | 2/2021 | Yu et al. |
| 2021/0068077 | A1 | 3/2021 | Raghavan et al. |
| 2021/0084672 | A1 | 3/2021 | Gulati et al. |
| 2021/0099958 | A1 * | 4/2021 | Bae ........................ H04W 52/18 |
| 2021/0105780 | A1 | 4/2021 | Jin et al. |
| 2021/0105860 | A1 | 4/2021 | Tsai et al. |
| 2021/0111779 | A1 | 4/2021 | Kundargi et al. |
| 2021/0119688 | A1 | 4/2021 | Enescu et al. |
| 2021/0127379 | A1 | 4/2021 | Harrebek et al. |
| 2021/0136598 | A1 | 5/2021 | Raghavan et al. |
| 2021/0144716 | A1 | 5/2021 | Choi et al. |
| 2021/0153085 | A1 | 5/2021 | Rahman et al. |
| 2021/0153209 | A1 | 5/2021 | Guan et al. |
| 2021/0159946 | A1 | 5/2021 | Raghavan et al. |
| 2021/0159966 | A1 | 5/2021 | Xi et al. |
| 2021/0160850 | A1 | 5/2021 | Akkarakaran et al. |
| 2021/0160881 | A1 | 5/2021 | Rahman et al. |
| 2021/0226681 | A1 | 7/2021 | Raghavan et al. |
| 2021/0234586 | A1 | 7/2021 | Raghavan et al. |
| 2021/0234593 | A1 | 7/2021 | Raghavan et al. |
| 2021/0234597 | A1 | 7/2021 | Raghavan et al. |
| 2021/0234602 | A1 | 7/2021 | Raghavan et al. |
| 2021/0234604 | A1 | 7/2021 | Raghavan et al. |
| 2021/0235434 | A1 | 7/2021 | Raghavan et al. |
| 2021/0250940 | A1 | 8/2021 | Raghavan et al. |
| 2021/0251040 | A1 | 8/2021 | Tang et al. |
| 2021/0265741 | A1 | 8/2021 | Kenington |
| 2021/0329621 | A1 | 10/2021 | Raghavan |
| 2021/0359826 | A1 | 11/2021 | Wang et al. |
| 2021/0410094 | A1 | 12/2021 | Cui et al. |
| 2022/0006539 | A1 | 1/2022 | Sun et al. |
| 2022/0070823 | A1 | 3/2022 | Ma et al. |
| 2022/0086702 | A1 | 3/2022 | Wang et al. |
| 2022/0149924 | A1 | 5/2022 | Zhang et al. |

(56) References Cited

U.S. PATENT DOCUMENTS

| | | | |
|---|---|---|---|
| 2022/0150717 | A1 | 5/2022 | Geng et al. |
| 2022/0200146 | A1 | 6/2022 | Du et al. |
| 2022/0201505 | A1 | 6/2022 | Zhao et al. |
| 2022/0210810 | A1 | 6/2022 | Khoshnevisan et al. |
| 2022/0210814 | A1 | 6/2022 | Khoshnevisan |
| 2022/0345908 | A1 | 10/2022 | Takano et al. |
| 2023/0051329 | A1 | 2/2023 | Flordelis et al. |
| 2024/0027821 | A1 | 1/2024 | Noguchi |
| 2024/0129922 | A1 | 4/2024 | Raghavan et al. |

FOREIGN PATENT DOCUMENTS

| | | |
|---|---|---|
| CN | 109391984 A | 2/2019 |
| CN | 109792610 A | 5/2019 |
| CN | 110073609 A | 7/2019 |
| CN | 110419177 A | 11/2019 |
| CN | 113287349 B | 11/2022 |
| EP | 3167653 A1 | 5/2017 |
| EP | 3536101 A1 | 9/2019 |
| JP | 2001526510 A | 12/2001 |
| JP | 2013501480 A | 1/2013 |
| TW | 201902262 A | 1/2019 |
| TW | 201921882 A | 6/2019 |
| TW | 201937873 A | 9/2019 |
| WO | WO-2014130893 A2 | 8/2014 |
| WO | WO-2016005843 A1 | 1/2016 |
| WO | 2016148838 A1 | 9/2016 |
| WO | WO-2016148838 | 9/2016 |
| WO | WO-2017007564 A1 | 1/2017 |
| WO | WO-2017204546 A1 | 11/2017 |
| WO | WO-2018075205 A1 | 4/2018 |
| WO | WO-2018085709 A1 | 5/2018 |
| WO | WO-2018128885 A1 | 7/2018 |
| WO | WO-2018144844 A1 | 8/2018 |
| WO | WO-2018219438 A1 | 12/2018 |
| WO | WO-2019014041 A1 | 1/2019 |
| WO | WO-2019029609 A1 | 2/2019 |
| WO | WO-2019140256 A1 | 7/2019 |
| WO | WO-2019192005 A1 | 10/2019 |
| WO | 2019213889 A1 | 11/2019 |
| WO | WO-2019231716 A1 | 12/2019 |
| WO | WO-2020020453 A1 | 1/2020 |
| WO | WO-2020096903 A1 | 5/2020 |
| WO | WO-2020101757 A1 | 5/2020 |
| WO | WO-2021041533 A1 | 3/2021 |
| WO | WO-2021144114 A1 | 7/2021 |
| WO | WO-2021154737 A9 | 9/2021 |
| WO | WO-2022170622 A1 | 8/2022 |

OTHER PUBLICATIONS

International Search Report and Written Opinion—PCT/US2021/015060—ISA/EPO—dated Apr. 21, 2021 (201350WO).

Motorola Mobility, et al., "Power Control for Multi-Panel Uplink Transmission", 3GPP TSG RAN WG1 AH-1901, 3GPP Draft; R1-1900944-PC-Emimo-Other-Final, 3rd Generation Partnership Project (3GPP), Mobile Competence Centre; 650, Route Des Lucioles; F-06921 Sophia-Antipolis Cedex; France, vol. RAN WG1, No. Taipei; Jan. 21, 2019-Jan. 25, 2019, 4 Pages, Jan. 20, 2019 (Jan. 20, 2019), XP051593788, Retrieved from the Internet: URL: http://www.3gpp.org/ftp/Meetings%5F3GPP%5FSYNC/RAN1/Docs/R1%2D1900944%2Ezip [retrieved on Jan. 20, 2019] p. 2, paragraph section 2.1—p. 3, paragraph section 2.2.

Samsung: "Discussions on NR UL Multi-Panel/Multi-TRP", 3GPP TSG RAN WG1 Meeting #90, 3GPP Draft; R1-1713579 UL Multi TRP Panel V0, 3rd Generation Partnership Project (3GPP), Mobile Competence Centre 650, Route Des Lucioles; F-06921 Sophia-Antipolis Cedex; France, vol. RAN WG1, No. Prague, Czechia; Aug. 21, 2017-Aug. 25, 2017, 3 Pages, Aug. 20, 2017 (Aug. 20, 2017), XP051316379, Retrieved from the Internet: URL: http://www.3gpp.org/ftp/Meetings_3GPP_SYNC/RAN1/Docs/ [retrieved on Aug. 20, 2017] p. 2—p. 3, figure 2.

Interdigital., et al., "Views on Panel Activation and Deactivation", 3GPP TSG RAN WG1 #98, 3GPP Draft; R1-1908233 Views on Panel Activation and Deactivation, 3rd Generation Partnership Project (3GPP), Mobile Competence Centre, 650, Route Des Lucioles, F-06921 Sophia-Antipolis Cedex, France, vol. RAN WG1, No. Prague, CZ; Aug. 26, 2019-Aug. 30, 2019, Aug. 16, 2019 (Aug. 16, 2019, 6 Pages, XP051764847, Retrieved from the Internet: URL: http://www.3gpp.org/ftp/tsg_ran/WG1_RL1/TSGR1_98/Docs/R1-1908233.zip, [retrieved on Aug. 16, 2019], Section 2, Section 3 (p. 5, gNB-Driven), figures 1-3.

Ericsson: "FFSs Regarding Early Measurement Configurations", 3GPP Draft, 3GPP TSG-RAN WG2#106, R2-1907254—FFSS Regarding Early Measurement Configurations, 3rd Generation Partnership Project (3GPP), Mobile Competence Centre, 650, Route Des Lucioles, F-06921 Sophia-Antipolis Cedex, vol. RAN WG2, No. Reno, Nevada, USA, May 13, 2019-May 17, 2019 May 13, 2019 (May 13, 2019), XP051730695, pp. 1-4, Retrieved from the Internet: URL:http://www.3gpp.org/ftp/Meetings%5F3GPP%5FSYNC/RAN2/Docs/R2%2D1907254%2Ezip [retrieved on May 13, 2019] p. 3, paragraph 2.3 p. 4, paragraph 2.4.

Huawei et al., "Low Latency of SCell Activation", 3GPP Draft, 3GPP TSG RAN WG1 Meeting #96bis, R1-1903992, 3rd Generation Partnership Project (3GPP), Mobile Competence Centre, 650, Route Des Lucioles, F-06921 Sophia-Antipolis Cedex, France, vol. RAN WG1, No. Xi'an, China, Apr. 8, 2019-Apr. 12, 2019, Apr. 7, 2019 (Apr. 7, 2019), XP051699403, 6 Pages, Retrieved from the Internet: URL:http://www.3gpp.org/ftp/Meetings%5F3GPP%5FSYNC/RAN1/Docs/R1%2D1903992%2Ezip [retrieved on Apr. 7, 2019] p. 2, paragraph 2.3—p. 3, paragraph 2.4 p. 4, paragraph 3 figures 3-5.

Fraunhofer Iis, et al., "Discussion on Signaling of Beam Correspondence", 3GPP TSG RAN WG1 Meeting #94bis, 3GPP Draft; R1-1811086_Discussion_on_Signaling_of_Beam_ Correspondence, 3rd Generation Partnership Project (3GPP), Mobile Competence Centre; 650, Route Des Lucioles; F-06921 Sophia-Antipolis Cedex, vol. RAN WG1, No. Chengdu, China; Oct. 8, 2018-Oct. 12, 2018, Sep. 28, 2018 (Sep. 28, 2018), 5 Pages, XP051518487, Retrieved from the Internet: URL: http://www.3gpp.org/ftp/tsg%5Fran/WG1%5FRL1/TSGR1%5F94b/Docs/R1%201811086%2Ezip [retrieved on Sep. 28, 2018], Sections 2-4; Figures 1-3.

Mediatek Inc: "Discussion on UL Beam Management Procedure", 3GPP TSG RAN WG1 Meeting #88, 3GPP Draft; R1-1702731 Discussion on UL Beam Management Procedure Final, 3rd Generation Partnership Project (3GPP), Mobile Competence Centre ; 650, Route Des Lucioles; F-06921 Sophia-Antipolis Cedex, vol. RAN WG1, No. Athens, Greece; Feb. 13, 2017-Feb. 17, 2017, Feb. 12, 2017 (Feb. 12, 2017), XP051209878, 4 Pages, Retrieved from the Internet: URL:http://www.3gpp.org/ftp/Meetings_3GPP_SYNC/RAN1/Docs/ [retrieved on Feb. 12, 2017]. sections 2-4.

Du, Y., et al., "Evaluation of PMI Feedback Schemes for MU-MIMO Pairing", IEEE Systems Journal, IEEE, US, vol. 4, No. 4, Dec. 1, 2010 (Dec. 1, 2010), XP011320688, pp. 505-510, ISSN: 1932-8184 p. 505.

Huawei, et al., "UL/DL BM for Latency/Overhead Reduction", 3GPP Draft, R1-1903974, 3GPP TSG RAN WG1 #96bis, 3rd Generation Partnership Project (3GPP), Mobile Competence Centre, 650, Route Des Lucioles, F-06921 Sophia-Antipolis Cedex, France, vol. RAN WG1, No. Xi'an, China, Apr. 8, 2019-Apr. 12, 2019, Apr. 7, 2019 (Apr. 7, 2019), XP051699387, 8 Pages, Retrieved from the Internet: URL:http://www.3gpp.org/ftp/Meetings%5F3GPP%5FSYNC/RAN1/Docs/R1%2D1903974%2Ezip [retrieved on Apr. 7, 2019] the Whole Document.

Lenovo, et al., "Discussion of Beam Failure Recovery for Carrier Aggregation", 3GPP Draft, 3GPP TSG RAN WG1 Meeting #92, R1-1804211_BFR, 3rd Generation Partnership Project (3GPP), Mobile Competence Centre, 650, Route Des Lucioles, F-06921 Sophia-Antipolis Cedex, France, vol. RAN WG1, No. Sanya, China, Apr. 16, 2018-Apr. 20, 2018, Apr. 6, 2018, XP051413160, 3 Pages, Retrieved from the Internet: URL:http://www.3gpp.org/ftp/tsg%5Fran/WG1%5FRL1/TSGR1%5F92b/Docs/, http://www.3gpp.org/ftp/tsg%5Fran/WG1%5FRL1/TSGR1%5F92b/Docs/, [retrieved on Apr. 6, 2018], p. 1, line 15—line 16 p. 2, line 6—line 16, the Whole Document.

(56) References Cited

OTHER PUBLICATIONS

Samsung: "Remaining Details on QCL", 3GPP Draft, 3GPP TSG RAN WG1 #90b, R1-1717634-QCL V2, 3rd Generation Partnership Project (3GPP), Mobile Competence Centre, 650, Route Des Lucioles, F-06921 Sophia-Antipolis Cedex, France, vol. RAN WG1, No. Prague, Czech Republic, Oct. 9, 2017-Oct. 13, 2017, Oct. 8, 2017 (Oct. 8, 2017), XP051340820, 9 Pages, Retrieved from the Internet: URL:http://www.3gpp.org/ftp/Meetings_3GPP_SYNC/RAN1/Docs/ retrieved on Oct. 8, 2017] p. 6—p. 7 p. 3.

Moderator (Samsung): "Moderator Summary for Multi-Beam Enhancement: Proposal Categorization", 3GPP TSG RAN WG1 #102-e, R1-2006985, e-Meeting, 20200817-20200828, 27 Pages, Aug. 25, 2020 (Aug. 25, 2020) sections 1-2, section 4.1, the whole document.

Raghavan, et al., "Antenna Placement and Performance Tradeoffs With Hand Blockage in Millimeter Wave Systems", IEEE, Apr. 2019 (Year: 2019), 16 Pages.

Ali A., et al., "Spatial Covariance Estimation for Millimeter Wave Hybrid Systems using Out-of-Band Information", May 2019, Center for Transportation Research, pp. 1-14.

Jain I. K., "Millimeter Wave Beam Training: A Survey", arXiv, Sep. 2018, 2 Pages.

Zheng Z., et al., "Time of Arrival and Time Sum of Arrival Based NLOS Identification and Localization", IEEE 2012, 5 Pages.

Nokia, et al., "On CSI-RS Design for DL Beam Management", 3GPP Draft, 3GPP TSG RAN WG1 #88, R1-1703179, Athens, Greece, Feb. 13-17, 2017, 14 Pages, Feb. 7, 2017.

Chen C., "Resolution to CIDs Related to Asymmetric Beamforming and Directional Allocation", IEEE 802.11-18/0158r3, Jan. 15, 2018, pp. 1-8.

Interdigital Inc: "Views on Panel Activation and Deactivation", 3GPP TSG RAN WG1 #98, R1-1908233, Prague, CZ, Aug. 26, 2019—Aug. 30, 2019, 6 Pages.

Fraunhofer Iis., et al., "Discussion on Signaling of Beam Correspondence", R1-1811086, 3GPP TSG RAN WG1 Meeting #94bis Chengdu, China Oct. 8-12, 2018, 5 Pages.

Mediatek Inc: "Discussion on UL Beam Management Procedure", R1-1702731, 3GPP TSG RAN WG1 Meeting #88 Athens, Greece, Feb. 13-17, 2017, 4 Pages.

Apple Inc: "FR2 DL Inter-Band CA Architecture Considerations", 3GPP RAN WG4 Meeting #93, R4-1913540, Reno, USA, Nov. 18-21, 2019, 8 Pages, Nov. 9, 2019.

Samsung: "Remaining Details on QCL", 3GPP TSG RAN WG1#90b, R1-1717634, Prague, Czech Republic, 9th-13th, Oct. 2017, 9 Pages, Oct. 3, 2017, Section 4, 4.2 Intercarrier QCL.

* cited by examiner

ANTENNA GROUP-SPECIFIC PARAMETER CONFIGURATION IN MILLIMETER WAVE COMMUNICATIONS

CROSS REFERENCE

The present application for patent claims the benefit of U.S. Provisional Patent Application No. 62/966,498 by Raghavan et al., entitled "ANTENNA GROUP-SPECIFIC PARAMETER CONFIGURATION IN MILLIMETER WAVE COMMUNICATIONS," filed Jan. 27, 2020, assigned to the assignee hereof, and expressly incorporated by reference in its entirety herein.

INTRODUCTION

The following relates generally to wireless communications and more specifically to configuration of antenna groups of a wireless device.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-s-OFDM). A wireless multiple-access communications system may include one or more base stations or one or more network access nodes, each simultaneously supporting communication for multiple communication devices, which may be otherwise known as user equipment (UE).

SUMMARY

A method of wireless communications is described. The method may include receiving, at a first wireless device, signaling indicating a first set of antenna elements for communications with a second wireless device, the first set of antenna elements including a first number of antenna elements from one or more of a set of antenna elements of the first wireless device, and communicating with the second wireless device, using the first set of antenna elements, based on one or more transmission control parameters, where the one or more transmission control parameters include a power control parameter for uplink transmissions via a millimeter wave frequency band to the second wireless device, and where the power control parameter is determined based on the first number of antenna elements.

An apparatus for wireless communications is described. The apparatus may include a processor, and memory coupled to the processor, the processor and memory configured to receive, at a first wireless device, signaling indicating a first set of antenna elements for communications with a second wireless device, the first set of antenna elements including a first number of antenna elements from one or more of a set of antenna elements of the first wireless device, and communicate with the second wireless device, using the first set of antenna elements, based on one or more transmission control parameters, where the one or more transmission control parameters include a power control parameter for uplink transmissions via a millimeter wave frequency band to the second wireless device, and where the power control parameter is determined based on the first number of antenna elements.

Another apparatus for wireless communications is described. The apparatus may include means for receiving, at a first wireless device, signaling indicating a first set of antenna elements for communications with a second wireless device, the first set of antenna elements including a first number of antenna elements from one or more of a set of antenna elements of the first wireless device, and communicating with the second wireless device, using the first set of antenna elements, based on one or more transmission control parameters, where the one or more transmission control parameters include a power control parameter for uplink transmissions via a millimeter wave frequency band to the second wireless device, and where the power control parameter is determined based on the first number of antenna elements.

A non-transitory computer-readable medium storing code for wireless communications is described. The code may include instructions executable by a processor to receive, at a first wireless device, signaling indicating a first set of antenna elements for communications with a second wireless device, the first set of antenna elements including a first number of antenna elements from one or more of a set of antenna elements of the first wireless device, and communicate with the second wireless device, using the first set of antenna elements, based on one or more transmission control parameters, where the one or more transmission control parameters include a power control parameter for uplink transmissions via a millimeter wave frequency band to the second wireless device, and where the power control parameter is determined based on the first number of antenna elements.

In some examples of the method, apparatuses, and non-transitory computer-readable medium described herein, the one or more transmission control parameters include a power control parameter for uplink transmissions via a millimeter wave frequency band to the second wireless device, and where the power control parameter may be determined based on the first number of antenna elements. In some examples of the method, apparatuses, and non-transitory computer-readable medium described herein, the one or more transmission control parameters include a modulation and coding scheme (MCS) dependent phase compensation parameter for downlink transmissions received from the second wireless device via a millimeter wave frequency band, where the MCS-dependent phase compensation parameter may be determined based on the first number of antenna elements.

Some examples of the method, apparatuses, and non-transitory computer-readable medium described herein may further include operations, features, means, or instructions for receiving, from the second wireless device, an indication to configure a digital beamforming codebook that is to be used for the communications with the second wireless device, where one or more parameters associated with the digital beamforming codebook are determined based on the first number of antenna elements.

In some examples of the method, apparatuses, and non-transitory computer-readable medium described herein, the receiving may include operations, features, means, or instructions for measuring one or more training signals received from the second wireless device using two or more different sets of antennas, transmitting a measurement report to the second wireless device that indicates the first set of antenna elements, and receiving an indication from the second wireless device that the first set of antenna elements may be to be used for communications with the second wireless device. In some examples of the method, apparatuses, and non-transitory computer-readable medium described herein, the measurement report may be transmitted to the second wireless device via radio resource control (RRC) signaling.

In some examples of the method, apparatuses, and non-transitory computer-readable medium described herein, the one or more transmission control parameters may be determined based on a mapping between the first number of antenna elements and associated transmission control parameters. In some examples of the method, apparatuses, and non-transitory computer-readable medium described herein, the millimeter wave frequency band includes frequencies that may be greater than 52.6 GHz. In some examples of the method, apparatuses, and non-transitory computer-readable medium described herein, The first wireless device may be a UE or a customer premises equipment (CPE) in a wireless communications system and the second wireless device may be a base station, a CPE, a relay device, a router, a repeater, or an integrated access and backhaul (IAB) node in the wireless communications system.

A method of wireless communication at a second wireless device is described. The method may include transmitting two or more training signals to a first wireless device as part of a beam training procedure for the first wireless device, receiving, from the first wireless device, an indication of a first set of antenna elements, the first set of antenna elements including a first number of antenna elements, and transmitting control information that indicates digital beamforming codebook parameters to the first wireless device, the digital beamforming codebook parameters configuring a digital beamforming codebook that is to be used for communications with the second wireless device, where the digital beamforming codebook parameters are determined based on the first number of antenna elements.

An apparatus for wireless communication at a second wireless device is described. The apparatus may include a processor, and memory coupled to the processor, the processor and memory configured to transmit two or more training signals to a first wireless device as part of a beam training procedure for the first wireless device, receive, from the first wireless device, an indication of a first set of antenna elements, the first set of antenna elements including a first number of antenna elements, and transmit control information that indicates digital beamforming codebook parameters to the first wireless device, the digital beamforming codebook parameters configuring a digital beamforming codebook that is to be used for communications with the second wireless device, where the digital beamforming codebook parameters are determined based on the first number of antenna elements.

Another apparatus for wireless communication at a second wireless device is described. The apparatus may include means for transmitting two or more training signals to a first wireless device as part of a beam training procedure for the first wireless device, receiving, from the first wireless device, an indication of a first set of antenna elements, the first set of antenna elements including a first number of antenna elements, and transmitting control information that indicates digital beamforming codebook parameters to the first wireless device, the digital beamforming codebook parameters configuring a digital beamforming codebook that is to be used for communications with the second wireless device, where the digital beamforming codebook parameters are determined based on the first number of antenna elements.

A non-transitory computer-readable medium storing code for wireless communication at a second wireless device is described. The code may include instructions executable by a processor to transmit two or more training signals to a first wireless device as part of a beam training procedure for the first wireless device, receive, from the first wireless device, an indication of a first set of antenna elements, the first set of antenna elements including a first number of antenna elements, and transmit control information that indicates digital beamforming codebook parameters to the first wireless device, the digital beamforming codebook parameters configuring a digital beamforming codebook that is to be used for communications with the second wireless device, where the digital beamforming codebook parameters are determined based on the first number of antenna elements.

Some examples of the method, apparatuses, and non-transitory computer-readable medium described herein may further include operations, features, means, or instructions for receiving, from the first wireless device, a power control parameter for uplink transmissions from the first wireless device that is associated with the first number of antenna elements, and receiving the uplink transmissions from the first wireless device based on one or more receive parameters, the one or more receive parameters based on the power control parameter. In some examples of the method, apparatuses, and non-transitory computer-readable medium described herein, the one or more receive parameters are determined based on a mapping between the first number of antenna elements and associated receive parameters.

In some examples of the method, apparatuses, and non-transitory computer-readable medium described herein, the indication of the first set of antenna elements is received with a measurement report from the first wireless device, and where the determining the digital beamforming codebook parameters are further based on the measurement report. In some examples of the method, apparatuses, and non-transitory computer-readable medium described herein, the measurement report may be received from the first wireless device via RRC signaling.

In some examples of the method, apparatuses, and non-transitory computer-readable medium described herein, the millimeter wave frequency band includes frequencies that may be greater than 52.6 GHz. In some examples of the method, apparatuses, and non-transitory computer-readable medium described herein, the first wireless device may be a UE or a CPE in a wireless communications system and the second wireless device may be a base station, a CPE, a relay device, a router, a repeater, or an IAB node in the wireless communications system.

DETAILED DESCRIPTION

Figure 1:
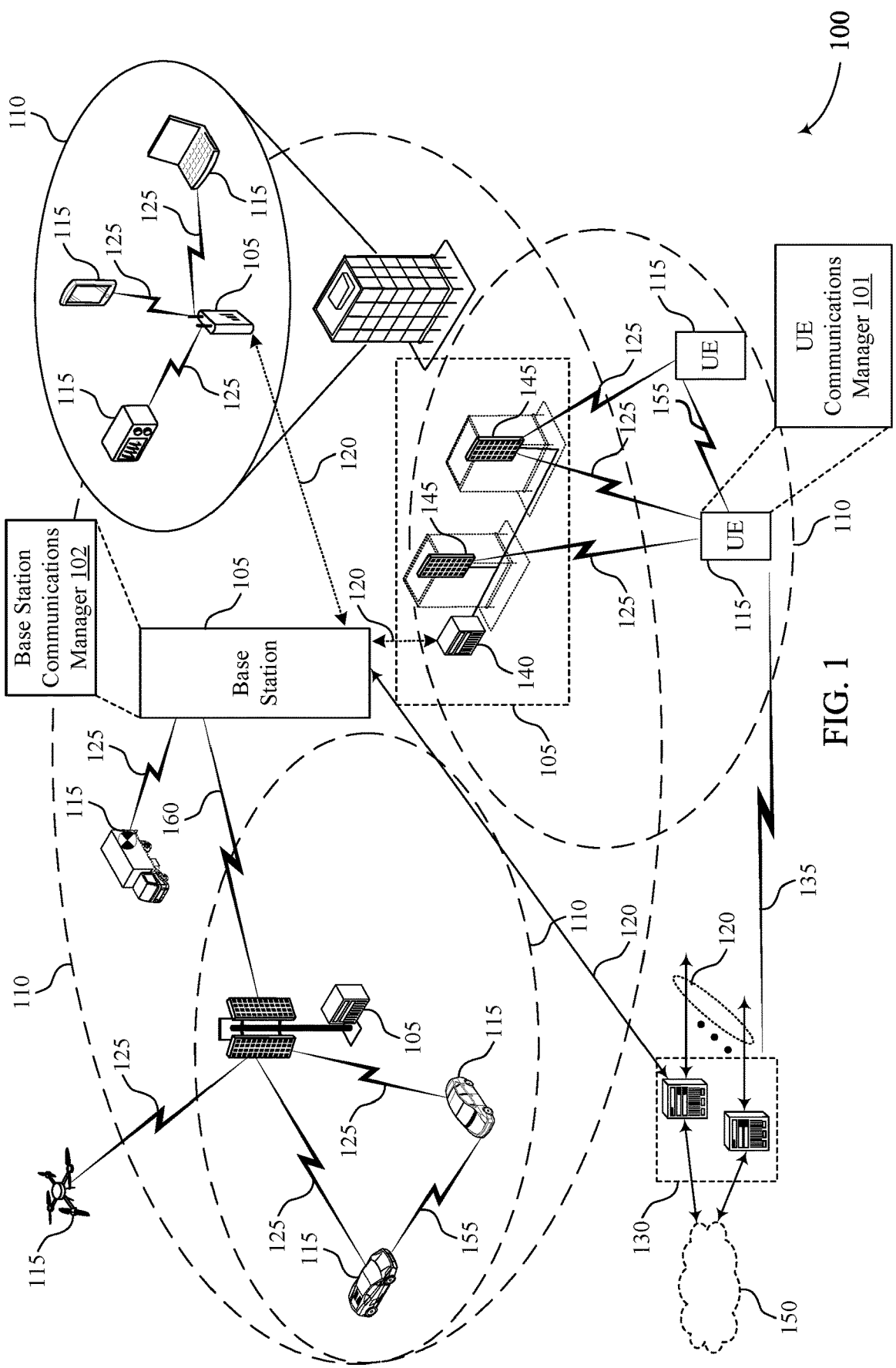
FIG. 1 illustrates an example of a system for wireless communications that supports antenna group-specific parameter configuration in millimeter wave communications in accordance with one or more aspects of the present disclosure.

In some deployments, wireless communications systems may operate in millimeter wave (mmW) frequency ranges (e.g., 24 GHz, 26 GHz, 28 GHz, 39 GHz, 52.6-71 GHz, etc.). Wireless communications at these frequencies may be associated with increased signal attenuation (e.g., path loss, penetration loss, blockage loss), which may be influenced by various factors, such as diffraction, propagation environment, density of blockages, material properties, etc. As a result, signal processing techniques, such as beamforming, may be used to coherently combine energy and overcome the path losses at these frequencies. Due to the increased amount of path, penetration and blockage losses in mmW communications systems, transmissions between wireless devices (e.g., from a base station and/or a UE) may be beamformed. Moreover, a receiving device may use beamforming techniques to configure antenna(s) and/or antenna array(s) and/or antenna array module(s) such that transmissions are received in a directional manner.

In some deployments, communications in mmW frequencies may utilize what is referred to as frequency range 2 (FR2), corresponding to deployments in 24-52.6 GHz (e.g., 24 GHz. 26 GHz, 28 GHz, 39 GHz, etc.). As demand for wireless communications increases, additional mmW frequencies may be desirable for some deployments, such as frequency range 4 (FR4) (also informally known as or upper mmW bands) which may be associated with 52.6 GHz and beyond. In many FR2 deployments, wireless devices use antenna modules that include a number of antenna elements, such as an array of four antenna elements per module in a 4×1 array arrangement, among other example configurations. Upper mmW bands have shorter wavelengths, and thus more antenna elements can be placed in the same physical aperture in FR4 than at FR2. For example, an FR4 device may have multiple antenna modules that each contain four 4×4 subarrays. In some cases, it may be easier for a wireless device (e.g., a UE) to use or manage some possible combinations of antenna elements across subarrays within an antenna module or across antenna modules than others.

Various aspects of the present disclosure provide that a wireless device may provide indications to one or more other wireless devices related to control parameters of one or more selected sets of antenna elements. For example, a first wireless device having a number of antenna modules that each have one or more sub-arrays of antenna elements may select a number of different sets of antenna elements for use in communications with a second wireless device, where the number of different sets can be substantially smaller than the total number of possible combinations of antenna elements. The first wireless device may determine one or more transmission control parameters for one or more of the sets of antenna elements based on a number of antenna elements in the particular set of antenna elements. The first wireless device may communicate with the second wireless device, using one or more of the sets of antenna elements (e.g., using a first set of antenna elements for receiving communications, and a second set of antenna elements for transmitting communications), using the determined transmission control parameters.

In some cases, the first wireless device may provide the one or more transmission control parameters to the second wireless device, for use in the communications with the first wireless device. The transmission control parameters may include, for example, an array size of one or more sets of antenna elements, an array geometry of the one or more sets of antenna elements, a beam pattern of the one or more sets of antenna elements, or any combinations thereof. With different sets of antenna groups, a digital beamforming codebook used for communications between the first wireless device and second wireless device may be configured specific to the particular set of antennas that is used for communications. Further, for power control, a maximum transmittable power at the first wireless device (e.g., $P_{cmax}$) may be dependent on the set of antenna elements used in communications due to, for example, effective isotropic radiated power (EIRP) limitations that may apply at the first wireless device, and different array sizes may lead to different array gains and thus impact $P_{cmax}$. Alternatively, for a given $P_{cmax}$, different antenna array configurations may lead to different maximum allowed array gains and thus different levels of minimum allowed beamwidths from the antenna arrays. Additionally, MCS-dependent phase noise compensation may be dependent upon antenna array sizes used. The transmission control parameters may provide information related to $P_{cmax}$, array information, or combinations thereof, that may be used to determine a MCS for communications, a digital beamforming codebook, MCS-dependent phase noise compensation, or any combinations thereof, based on a number of antenna elements of the group of antenna elements that are to be used for communications.

Such techniques may be useful to indicate preferred groups of antenna elements and associated parameters, for use in transmitting and receiving beamformed communications. For example, an antenna group size of an antenna group to be used for communications may result in a particular $P_{cmax}$, which transmitting wireless device may indicate to a receiving wireless device for use in setting one or more parameters for a communication (e.g., a MCS for a communication). Additionally or alternatively, different antenna group sizes, geometries, or beam patterns may have different digital beamforming codebooks, and thus an indication of the antenna group size, geometry, and/or beam pattern may be used for selecting a digital beamforming codebook. Thus, providing indications of transmission control parameters may allow for communications to be configured to provide enhanced efficiency and reliability, while allowing a wireless device to select particular group of antenna elements that may be preferred at the wireless device (e.g., to reduce power consumption, manage thermal overheads associated with different radio frequency components, manage which antenna arrays or modules are active, etc.).

Aspects of the disclosure are initially described in the context of wireless communications systems. Examples of antenna modules and groups of antenna elements are then discussed for some aspects. Aspects of the disclosure are further illustrated by and described with reference to apparatus diagrams, system diagrams, and flowcharts that relate to antenna group-specific parameter configuration in millimeter wave communications.

FIG. 1 illustrates an example of a wireless communications system 100 that supports antenna group-specific parameter configuration in millimeter wave communications in accordance with one or more aspects of the present disclosure. The wireless communications system 100 may include one or more base stations 105, one or more UEs 115, and a core network 130. In some examples, the wireless communications system 100 may be an LTE network, an LTE-A network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, repeater devices, CPE, IAB nodes, router devices, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links. In some examples, the one or more base stations 105 may provide backhaul connectivity between another base station 105 and core network 130 via a backhaul link 160 while acting as an IAB node. A UE 115 may communicate with the core network 130 through a communication link 155.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays, routers, or CPE, as well as the base stations 105 and the network equipment including macro eNBs or gNBs, small cell eNBs or gNBs, IAB nodes, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

The electromagnetic spectrum is often subdivided, based on frequency/wavelength, into various classes, bands, channels, etc. In 5G NR two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, FR4, FR4-a or FR4-1, and/or FR5, or may be within the EHF band.

Signal waveforms transmitted over a carrier may be made up of multiple subcarriers (e.g., using multi-carrier modulation (MCM) techniques such as orthogonal frequency division multiplexing (OFDM) or DFT-S-OFDM). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to the network operators IP services 150. The operators IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, sometimes in the range of 300 megahertz (MHz) to 300 gigahertz (GHz). Oftentimes, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an EHF region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), or a channel state information reference signal (CSI-RS)), which may be precoded or unprecoded, or both. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

UEs 115 may include one or more antenna modules that may include a relatively large number of antenna elements for mmW communications, and may be an example of a first wireless device as discussed herein. A UE communications manager 101 may manage mmW communications, and in some cases may receive signaling indicating one or more different groups of antenna elements from one or more antenna modules that are preferred for use at the UE 115. The UE communications manager 101 may provide an indication of one or more transmission control parameters to a second wireless device, such as a base station 105. The transmission control parameters may indicate, for example, power control parameters that may be dependent upon the number of antenna elements of an indicated group of antenna elements, parameters related to one or more selected groups of antennas such as array size, geometry, or beam pattern, digital beamforming parameters that are based on the number of antenna elements, or any combinations thereof. The transmission control parameters may be used to establish one or more beams to be used for communications using one or more of the different groups of antenna elements that were indicated by the UE communications manager 101.

One or more of the base stations 105 may be an example of a second wireless device as discussed herein, and may include a base station communications manager 102. The base station communications manager 102 may receive the indication of the transmission control parameters based on array size from the first wireless device, and may in some cases determine wireless resources, transmit power, MCS, digital beamforming codebooks, or any combinations thereof, for communications with the first wireless device.

Figure 2:
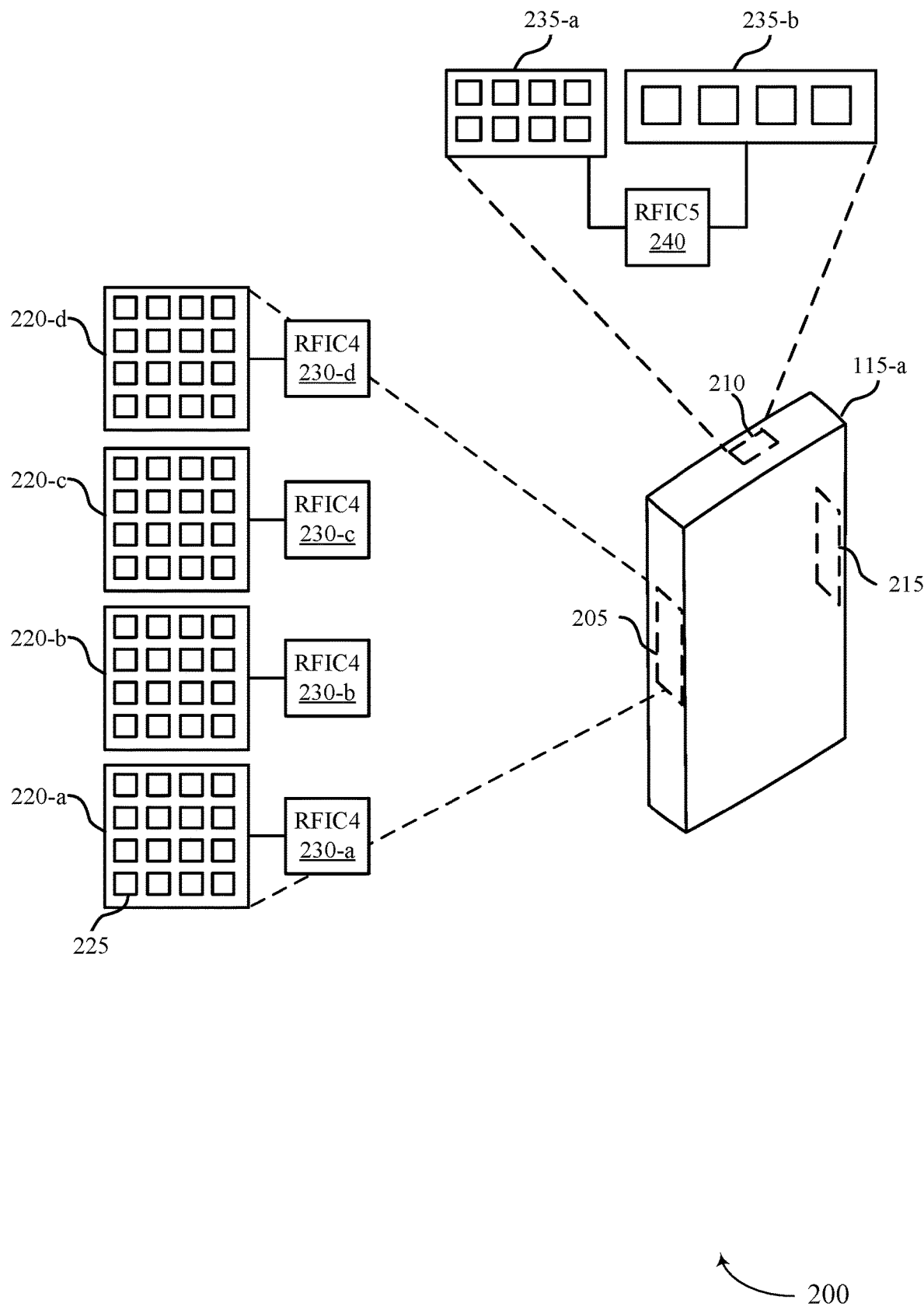
FIG. 2 illustrates an example of a wireless communication device with multiple antenna arrays that supports antenna group-specific parameter configuration in millimeter wave communications in accordance with one or more aspects of the present disclosure.

FIG. 2 illustrates an example of a wireless communication device with multiple antenna arrays 200 that supports antenna group-specific parameter configuration in millimeter wave communications in accordance with one or more aspects of the present disclosure. In some examples, wireless communication device with multiple antenna arrays 200 may implement aspects of wireless communications system 100. In this example, the wireless communication device may be a UE 115-*a*, although in other cases the wireless communication device may be a different device, such as a CPE, a relay device, a router, a repeater, or an IAB node.

In this example, the UE 115-*a* includes a number of different antenna modules, including a first antenna module 205, a second antenna module 210, and a third antenna module 215. Each of the antenna modules 205 through 215 may include a number of subarrays 220 of antenna elements. In this example, the first antenna module 205 may include four subarrays 220, including a first subarray 220-*a*, a second subarray 220-*b*, a third subarray 220-*c*, and a fourth subarray 220-*d*. Each subarray 220 in this example may include 16 individual antenna elements 225 arranged in a 4×4 array configuration. Each antenna element 225, in some cases, may be a patch antenna element configured to communicate in a high-band mmW deployment. Thus, in various aspects, the UE 115-*a* (or other device) may include a number of antenna elements that may be spread across a number of antenna arrays, antenna subarrays, antenna modules, or any combinations thereof. In some cases, the spacing of antenna elements 225 within each subarray 220 may be configured to provide for efficient analog beamforming at wavelengths associated with high-band mmW communications (e.g., in FR4). Further, in this example, each subarray 220 may include an associated radio frequency integrated circuit (RFIC) 230.

In the example of FIG. 2, the second antenna module 210 also may include multiple subarrays 235, including a fifth subarray 235-*a* and a sixth subarray 235-*b*. In this example, the fifth subarray 235-*a* includes eight antenna elements arranged in a 4×2 array configuration, and the sixth subarray 235-*b* includes four antenna elements arranged in a 4×1 array configuration. In this case, a single RFIC (RFICS) 240 may be coupled with the subarrays 235, although multiple RFICs may be used or an RFIC may be shared with one or more other of the antenna modules 205 or 215. While the antenna module 210 is illustrated as having multiple subarrays 235 that are different sizes, other examples may have a same number of subarrays 235 with each subarray having a same size (e.g., four 4×4 antenna subarrays similarly as illustrated in the first antenna module 205). Techniques as discussed herein may be applied to any numbers of antenna modules 205 through 215, any numbers of subarrays included in each antenna module, any numbers of antennas per subarray, or any combinations thereof.

As discussed herein, multiple RFICs 230 and associated antenna subarrays 220 may be used at different times by the wireless device. For example, in the case of FIG. 2 where the wireless device is UE 115-a, it may be desirable to operate using a subset of the antenna modules 205-215, using a subset of antenna subarrays 220 and associated RFICs 230, using a subset of antenna elements 225 within one or more subarrays 220, or any combinations thereof. Such operations may allow the UE 115-a to manage power consumption in order to reduce power used by RFIC components, for example. In other cases, the UE 115-a may determine, in addition to or alternatively to power consumption considerations, that one or more maximum permissible exposure (MPE) limitations, one or more thermal limitations, or combinations thereof, make it desirable to use some groups of antenna elements 225 of one or more subarrays 220. Thus, even though a relatively large number of antenna elements 225 are available at the UE 115-a, not all elements may be used at any particular instant in time. For example, the UE 115-a may have a total of N antenna elements 225 across each of the different antenna modules 205-215, and may choose K antenna elements 225 for communications, which results in $^{N}C_{K}$ possibilities, which can result in a relatively large number of combinations of different antenna elements 225. The computational and processing complexity of searching over these large number of combinations could be excessive to disallow its use in practical mmW communications. Thus, in some cases, the UE 115-a may select a relatively small list of antenna groups that are useful at a given time (e.g., based on power consumption, MPE consideration, thermal considerations, complexity considerations, antenna and architectural considerations, etc.). The UE 115-a may provide an indication of the selected antenna groups to a second wireless device (e.g., a base station) along with an indication of one or more transmission parameters that are based on a number of antenna elements of one or more antenna groups. Communications then may be established using one of the indicated antenna groups based on the one or more transmission parameters and number of antenna elements in the antenna group. Various examples of indications transmission control parameters of one or more antenna groups and procedures based on such indications are discussed with reference to FIGS. 3 and 4.

Figure 3:
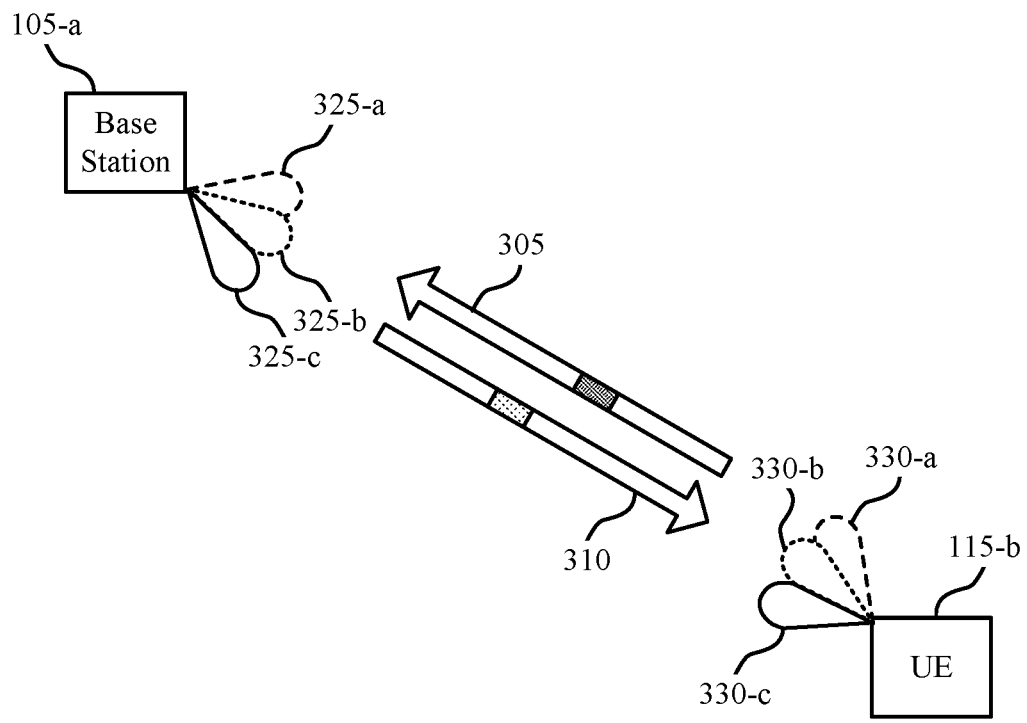
FIG. 3 illustrates an example of a wireless communications system that supports antenna group-specific parameter configuration in millimeter wave communications in accordance with one or more aspects of the present disclosure.

FIG. 3 illustrates an example of a wireless communications system 300 that supports antenna group-specific parameter configuration in millimeter wave communications in accordance with one or more aspects of the present disclosure. In some examples, wireless communications system 300 may implement aspects of wireless communications system 100. In some examples, the wireless communications system 300 may include a UE 115-b, and a base station 105-a which may be examples of UEs 115 and base stations 105 described with reference to FIGS. 1-2. Further, UE 115-b may be an example of a first wireless device, and the base station 105-a may be an example of a second wireless device. The UE 115-b and base station 105-a may communicate using beamformed communications in which the UE 115-b transmits uplink communications 305 to the base station 105-a, and the base station 105-a transmits downlink communications 310 to the UE 115-b.

In some cases, the UE 115-b may include a relatively large number of antenna elements, which may be spread across one or more antenna subarrays and one or more antenna modules, such as discussed with reference to FIG. 2. The UE 115-b may transmit antenna selection information 315 to the base station 105-a that indicates one or more different antenna groups that have been selected at the UE 115-b and are preferred for use in establishing transmission beams for mmW communications, and one or more transmission control parameters associated with the one or more antenna groups. The one or more transmission control parameters may be based on a number of antenna elements in the associated antenna group. In some cases, one or more transmission control parameters may be mapped to a number of antenna elements of an antenna group, one or more attributes of a transmission, or combinations thereof. For example, a MCS-dependent phase noise compensation may be mapped to a particular set of configured MCSs and number of antenna elements used in transmissions. In cases where such a mapping may be implemented, the mapping may be preconfigured or provided to the UE 115-b when configuring a connection establishment or reestablishment.

In some cases, the base station 105-a may initiate one or more procedures based on the antenna selection information 315, such as a beam training procedure based on the indicated antenna groups, where different base station beams 325 and different UE beams 330 may be tested and measured to identify a preferred beam for communications. For example, the UE 115-b may measure reference signals of multiple base station beams 325 using multiple UE beams 330 and select a preferred beam, and provide feedback to the base station 105-a on the selected beam, such as through a chosen transmission configuration indication (TCI) state. In some cases, the UE 115-b may transmit a CSI measurement report to the base station 105-a based on measurements of the beam training procedure. Further, in some cases, the UE 115-b may transmit the one or more transmission control parameters associated with the selected beam and associated group of antenna elements once the preferred beam has been selected, which may then be used by the base station 105-a for allocating resources to the UE 115-b, scheduling communications for the UE 115-b, setting a digital beamforming codebook, setting one or more power control parameters, or any combinations thereof.

In some cases, the transmission control parameters may include, for example, an array size of one or more groups (which may also be referred to as sets) of antenna elements, an array geometry of the one or more sets of antenna elements, information associated with a beam pattern of the one or more sets of antenna elements (e.g., beamwidths, side lobe levels, array gains, etc.), or any combinations thereof. With different sets of antenna elements, a digital beamforming codebook used for communications between the UE 115-b and base station 105-a may be configured specific to the particular group of antennas that is used for communications, and may be indicated in a digital beamforming configuration 320 provided by the base station 105-a. In some examples, the digital beamforming configuration 320 may be provided in downlink control information (DCI) with a resource grant that is provided to the UE 115-b for uplink or downlink communications. Further, for power control, a maximum transmittable power at the UE 115-b (e.g., $P_{cmax}$) may be dependent on the group of antenna elements used in communications due to EIRP limitations that may apply at the UE 115-b, and different array sizes may lead to different array gains and thus impact $P_{cmax}$. Additionally, MCS-dependent phase noise compensation may be dependent upon antenna array size. The transmission control parameters may provide information related to $P_{cmax}$, array information, or combinations thereof, that may be used to determine a MCS for communications, a digital beamforming codebook, MCS-dependent phase noise compensation, or any combinations thereof, based on a number of antenna elements of the group of antenna elements that are to be used for communications. Additionally, the base station 105-a may use the indication of antenna groups to help with scheduling based on data rates and antenna gains of the one or more groups of antenna elements that are used for communications.

Figure 4:
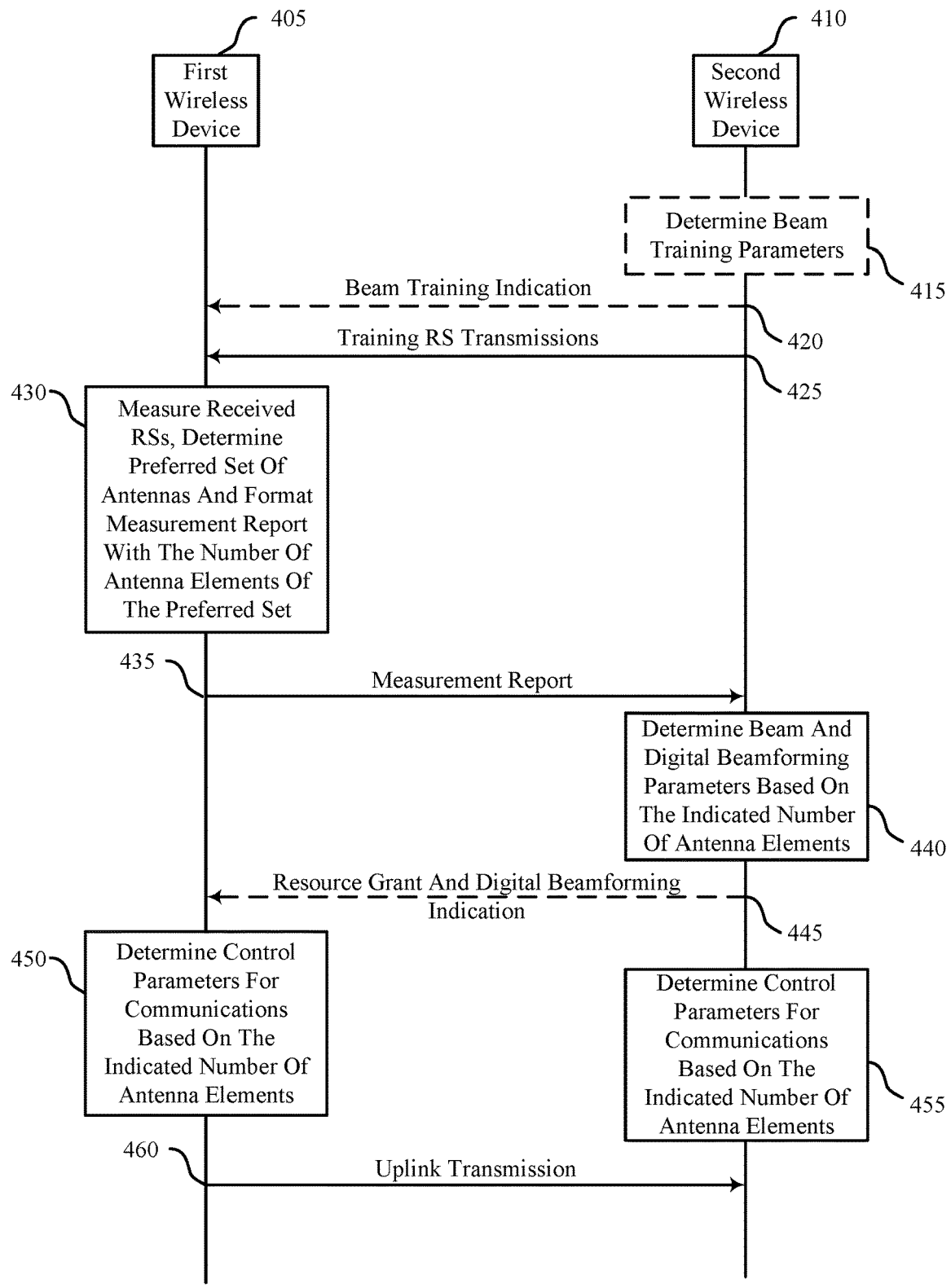
FIG. 4 illustrates an example of a process flow that supports antenna group-specific parameter configuration in millimeter wave communications in accordance with one or more aspects of the present disclosure.

FIG. 4 illustrates an example of a process flow 400 that supports antenna group-specific parameter configuration in millimeter wave communications in accordance with one or more aspects of the present disclosure. In some examples, process flow 400 may implement aspects of wireless communications system 100 or 300. Process flow 400 may be implemented by first wireless device 405 and a second wireless device 410 as described herein. Alternative examples of the following may be implemented, where some steps are performed in a different order than described or are not performed at all. In some cases, steps may include additional features not mentioned below, or further steps may be added.

At 415, in some examples, the second wireless device 410 may determine one or more beam training parameters for initiating a beam training procedure for the first wireless device 405. In some cases, the one or more beam training parameters may be determined based on an indication of a number of different groups of antenna elements that have been selected by the first wireless device 405 for communications (e.g., based on desired power consumption of antenna modules at the first wireless device 405, thermal management procedures at the first wireless device 405, MPE management procedures at the first wireless device, etc.). For example, the first wireless device 405 may have a number of different antenna modules, each of which may have one or more antenna subarrays. Further, in some cases, each antenna summary may have its own associated RFIC. The first wireless device 405 may desire to limit the number of antenna modules and/or RFICs that are active at any particular time, in order to conserve power, manage thermal properties, manage MPE, or any combinations thereof. In such cases, the first wireless device 405 may identify antenna elements associated with particular antenna subarrays that are desired to be used for a particular time period, which may be provided to the second wireless device 410 and used to determine the beam training parameters.

At 420, in some examples, the second wireless device 410 may transmit a beam training indication to the first wireless device 405. The beam training indication may provide information related to resources that are to be used for transmitting training beams, parameters related to the training beams, and the like. At 425, the second wireless device 410 may transmit reference signal transmissions using multiple beams as part of the beam training procedure. In some cases, the second wireless device 410 may use a beam sweep procedure in which reference signals (e.g., CSI-RSs) may be transmitted in consecutive different beams in accordance with one or more the determined beam training parameters.

At 430, the first wireless device may measure received reference signals, determine a preferred set of antennas, and format a measurement report. The measurement report (e.g., a CSI measurement report) may include information related to measurements of one or more received reference signals (e.g., RSRP, SNR, etc.), and one or more transmission control parameters associated with one or more preferred groups of antenna elements that are based on a number of antenna elements in the group of antenna elements. In some cases, the first wireless device 405 may transmit an indication of a number of antenna elements in one or more preferred groups of antenna elements. In some cases, the first wireless device 405 may also provide a geometry of the one or more groups of antenna elements (e.g., planar array, linear array, distributed array, irregular array, etc.), information on an antenna beam pattern of the one or more groups of antenna elements (e.g., narrowest beamwidth, best array gains and highest side lobes seen with beams useable on the array, etc.), or any combinations thereof. At 435, the first wireless device 405 may transmit the measurement report to the second wireless device 410.

At 440, the second wireless device 410 may determine beam and digital beamforming parameters for communications with the first wireless device 405 based on the indicated number of antenna elements of the one or more groups of antenna elements. In some cases, the second wireless device 410 may determine a transmission power for communications with the first wireless device 405, a MCS for the communications with the first wireless device 405, and parameters that determine a digital beamforming codebook for the communications with the first wireless device 405. At 445, in some examples, the second wireless device 410 may transmit a resource grant to the first wireless device 405 that may indicate resources and related parameters for an uplink or downlink grant, along with a digital beamforming indication (e.g., a PMI that is mapped to a digital beamforming codebook). In some cases, the resource grant may be transmitted to the first wireless device 405 in a DCI transmission in a physical downlink control channel.

At 450, the first wireless device 405 may determine control parameters for communications with the second wireless device 410 based on the indicated number of antenna elements, and the resource grant and digital beamforming indication. In some cases, the first wireless device 405 may determine MCS-dependent phase noise compensation that is dependent on antenna array used for the communications and the MCS that is indicated in the resource grant. At 455, the second wireless device 410 also may determine control parameters for communications with the second wireless device 410 based on the indicated number of antenna elements. At 460, the first wireless device 405 may transmit an uplink transmission to the second wireless device 410. The uplink transmission may be transmitted using the determined control parameters, and may be received at the second wireless device 410 based on receive parameters determined based on the number of elements in the antenna array that are used for transmission at the first wireless device 405.

Figure 5:
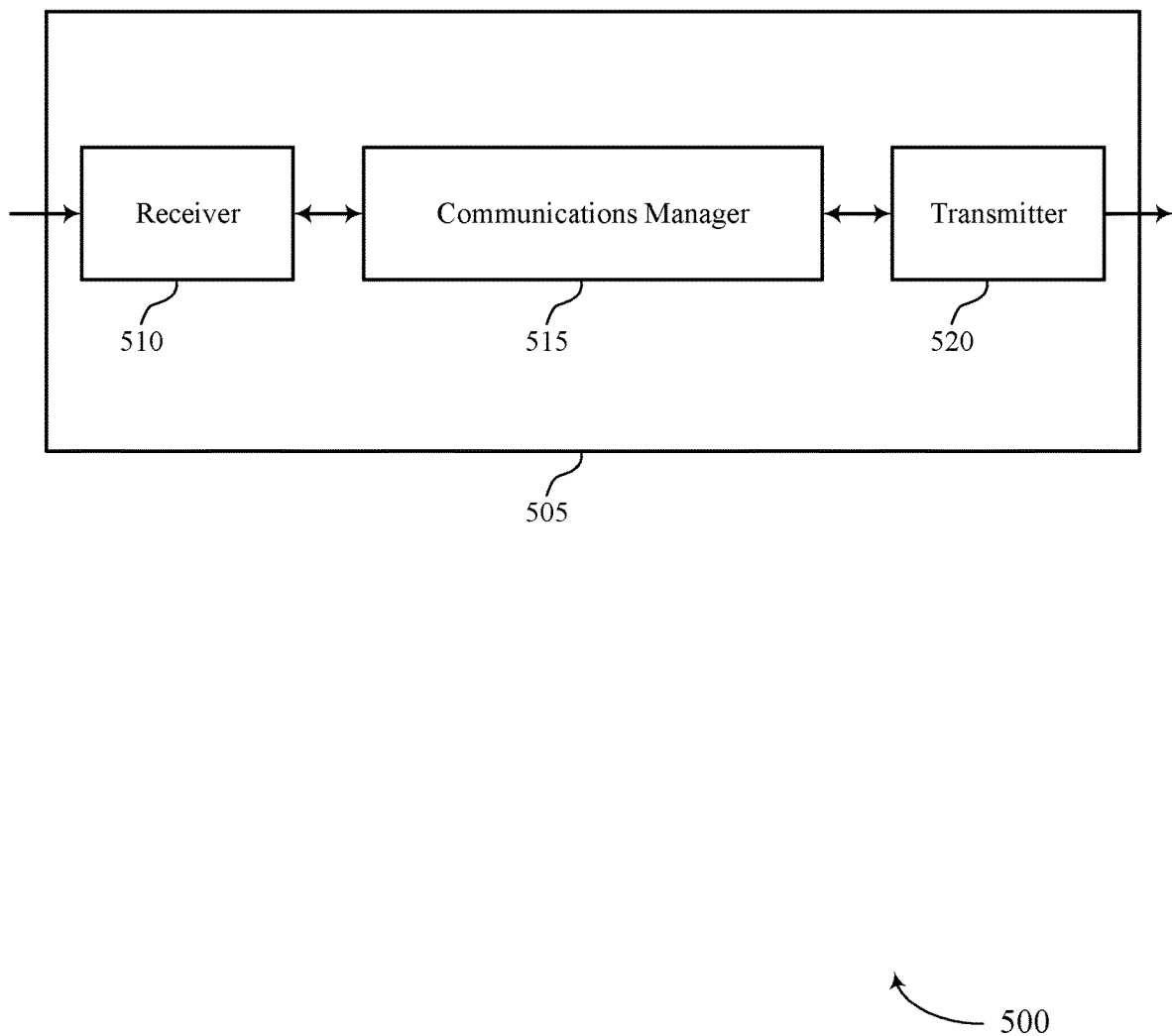
FIGS. 5 and 6 show block diagrams of devices that support antenna group-specific parameter configuration in millimeter wave communications in accordance with one or more aspects of the present disclosure.

FIG. 5 shows a block diagram 500 of a device 505 that supports antenna group-specific parameter configuration in millimeter wave communications in accordance with one or more aspects of the present disclosure. The device 505 may be an example of aspects of a first wireless device or a UE 115 as described herein. The device 505 may include a receiver 510, a communications manager 515, and a transmitter 520. The device 505 may also include a processor. Each of these components may be in communication with one another (e.g., via one or more buses).

The receiver 510 may receive information such as packets, user data, or control information associated with various information channels (e.g., control channels, data channels, and information related to antenna group-specific parameter configuration in millimeter wave communications, etc.). Information may be passed on to other components of the device 505. The receiver 510 may be an example of aspects of the transceiver 820 described with reference to FIG. 8. The receiver 510 may utilize a single antenna or a set of antennas.

The communications manager 515 may receive signaling indicating a first set of antenna elements for communications with a second wireless device, the first set of antenna elements including a first number of antenna elements from one or more of a set of antenna elements of the first wireless device, and communicate with the second wireless device, using the first set of antenna elements, based on one or more transmission control parameters, where the one or more transmission control parameters include a power control parameter for uplink transmissions via a millimeter wave frequency band to the second wireless device, and where the power control parameter is determined based on the first number of antenna elements. The communications manager 515 may be an example of aspects of the communications manager 810 described herein.

The communications manager 515 may as described herein be implemented to realize one or more potential advantages. One implementation may allow the device 505 to provide an indication of a number of antenna elements of preferred antenna groups that may allow for efficient determination of transmission control parameters for beamformed communications. Further, implementations may allow the device 505 to utilize processing resources more efficiently, among other advantages.

The communications manager 515 may be an example of means for performing various aspects of configuration of antenna groups as described herein. The communications manager 515, or its sub-components, may be implemented in hardware (e.g., in communications management circuitry). The circuitry may comprise of processor, digital signal processor (DSP), an application-specific integrated circuit (ASIC), a field programmable gate array (FPGA) or other programmable logic device, discrete gate or transistor logic, discrete hardware components, or any combination thereof designed to perform the functions described in the present disclosure.

In another implementation, the communications manager 515, or its sub-components, may be implemented in code (e.g., as communications management software or firmware) executed by a processor, or any combination thereof. If implemented in code executed by a processor, the functions of the communications manager 515, or its sub-components may be executed by a general-purpose processor, a DSP, an ASIC, an FPGA or other programmable logic device.

In some examples, the communications manager 515 may be configured to perform various operations (e.g., receiving, transmitting, measuring) using or otherwise in cooperation with the receiver 510, the transmitter 520, or both.

The communications manager 515, or its sub-components, may be physically located at various positions, including being distributed such that portions of functions are implemented at different physical locations by one or more physical components. In some examples, the communications manager 515, or its sub-components, may be a separate and distinct component in accordance with various aspects of the present disclosure. In some examples, the communications manager 515, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 520 may transmit signals generated by other components of the device 505. In some examples, the transmitter 520 may be collocated with a receiver 510 in a transceiver module. For example, the transmitter 520 may be an example of aspects of the transceiver 820 described with reference to FIG. 8. The transmitter 520 may utilize a single antenna or a set of antennas.

Figure 6:
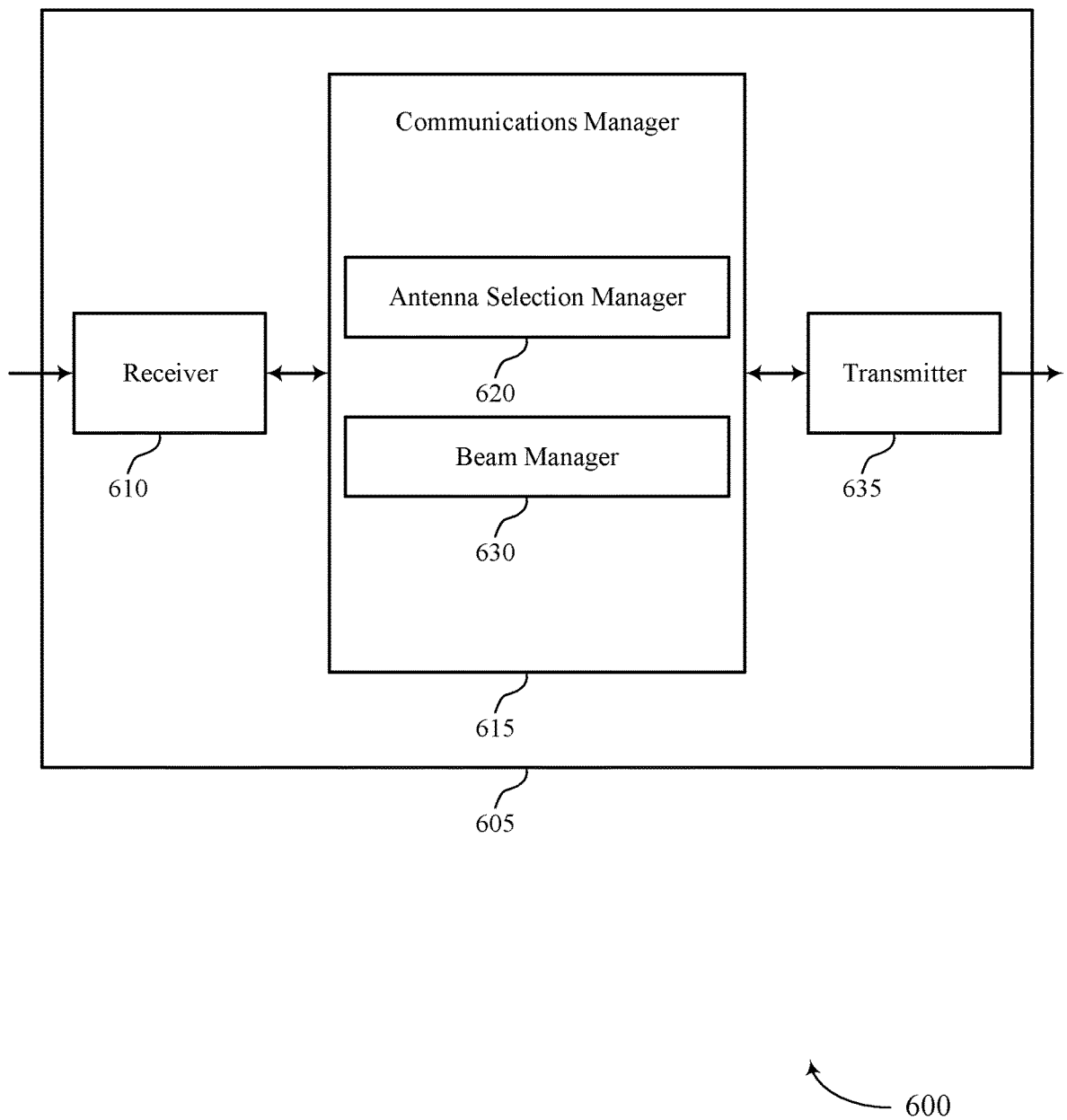

FIG. 6 shows a block diagram 600 of a device 605 that supports antenna group-specific parameter configuration in millimeter wave communications in accordance with aspects of the present disclosure. The device 605 may be an example of aspects of a device 505, a first wireless device, or a UE as described herein. The device 605 may include a receiver 610, a communications manager 615, and a transmitter 635. The device 605 may also include a processor. Each of these components may be in communication with one another (e.g., via one or more buses).

The receiver 610 may receive information such as packets, user data, or control information associated with various information channels (e.g., control channels, data channels, and information related to antenna group-specific parameter configuration in millimeter wave communications, etc.). Information may be passed on to other components of the device 605. The receiver 610 may be an example of aspects of the transceiver 820 described with reference to FIG. 8. The receiver 610 may utilize a single antenna or a set of antennas.

The communications manager 615 may be an example of aspects of the communications manager 515 as described herein. The communications manager 615 may include an antenna selection manager 620, and a beam manager 630. The communications manager 615 may be an example of aspects of the communications manager 810 described herein.

The antenna selection manager 620 may receive signaling indicating a first set of antenna elements for communications with a second wireless device, the first set of antenna elements including a first number of antenna elements from one or more of a set of antenna elements of the first wireless device.

The beam manager 630 may communicate with the second wireless device, using the first set of antenna elements, based on one or more transmission control parameters, where the one or more transmission control parameters may include a power control parameter for uplink transmissions via a millimeter wave frequency band to the second wireless device, and where the power control parameter may be determined based on the first number of antenna elements.

The transmitter 635 may transmit signals generated by other components of the device 605. In some examples, the transmitter 635 may be collocated with a receiver 610 in a transceiver module. For example, the transmitter 635 may be an example of aspects of the transceiver 820 described with reference to FIG. 8. The transmitter 635 may utilize a single antenna or a set of antennas.

Figure 7:
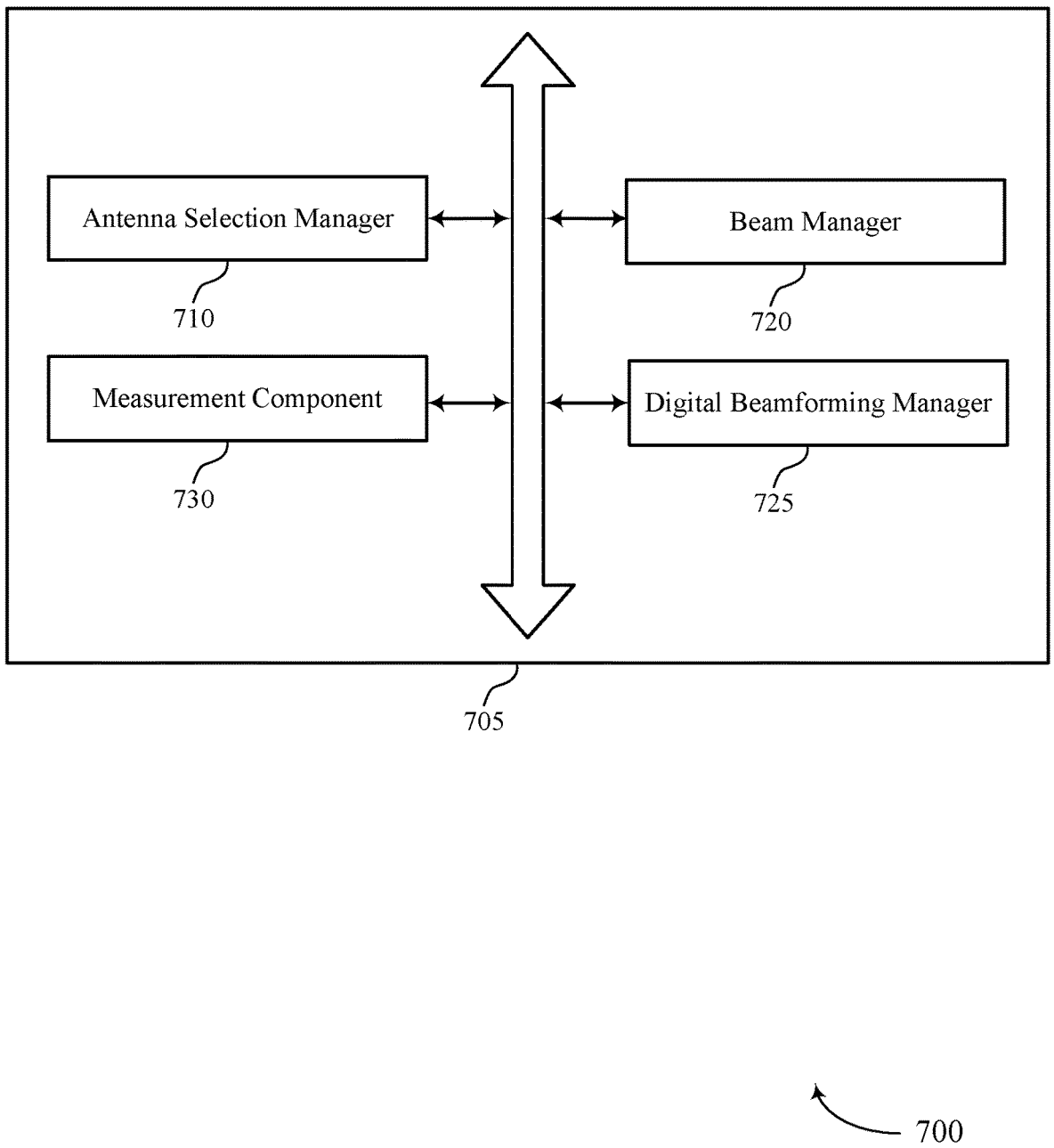
FIG. 7 shows a block diagram of a communications manager that supports antenna group-specific parameter configuration in millimeter wave communications in accordance with one or more aspects of the present disclosure.

FIG. 7 shows a block diagram 700 of a communications manager 705 that supports antenna group-specific parameter configuration in millimeter wave communications in accordance with one or more aspects of the present disclosure. The communications manager 705 may be an example of aspects of a communications manager 515, a communications manager 615, or a communications manager 810 described herein. The communications manager 705 may include an antenna selection manager 710, a beam manager 720, a digital beamforming manager 725, and a measurement component 730. Each of these modules may communicate, directly or indirectly, with one another (e.g., via one or more buses).

The antenna selection manager 710 may receive signaling indicating a first set of antenna elements for communications with a second wireless device, the first set of antenna elements including a first number of antenna elements from one or more of a set of antenna elements of the first wireless device. In some cases, the arrays of antenna elements may be used for communications in a millimeter wave frequency band that includes frequencies that are greater than 52.6 GHz. In some cases, the first wireless device is a UE or a CPE in a wireless communications system and the second wireless device is a base station, a CPE, a relay device, a router, a repeater, or an IAB node in the wireless communications system.

The beam manager 720 may communicate with the second wireless device, using the first set of antenna elements, based on one or more transmission control parameters, where the one or more transmission control parameters may include a power control parameter for uplink transmissions via a millimeter wave frequency band to the second wireless device, and where the power control parameter may be determined based on the first number of antenna elements. In some examples, the beam manager 720 may receive an indication from the second wireless device that the first set of antenna elements is to be used for communications with the second wireless device. In some cases, the one or more transmission control parameters include a power control parameter for uplink transmissions via a millimeter wave frequency band to the second wireless device, and where the power control parameter is determined based on the first number of antenna elements. In some cases, the one or more transmission control parameters include an MCS dependent phase compensation parameter for downlink transmissions received from the second wireless device via a millimeter wave frequency band, where the MCS-dependent phase compensation parameter is determined based on the first number of antenna elements. In some cases, the one or more transmission control parameters are determined based on a mapping between the first number of antenna elements and associated transmission control parameters.

The digital beamforming manager 725 may receive, from the second wireless device, an indication to configure a digital beamforming codebook that is to be used for the communications with the second wireless device, where one or more parameters associated with the digital beamforming codebook are determined based on the first number of antenna elements.

The measurement component 730 may measure one or more training signals received from the second wireless device using two or more different sets of antennas. In some examples, the measurement component 730 may transmit a measurement report to the second wireless device that indicates a first set of antenna elements. In some cases, the measurement report is transmitted to the second wireless device via RRC or MAC-CE signaling.

Figure 8:
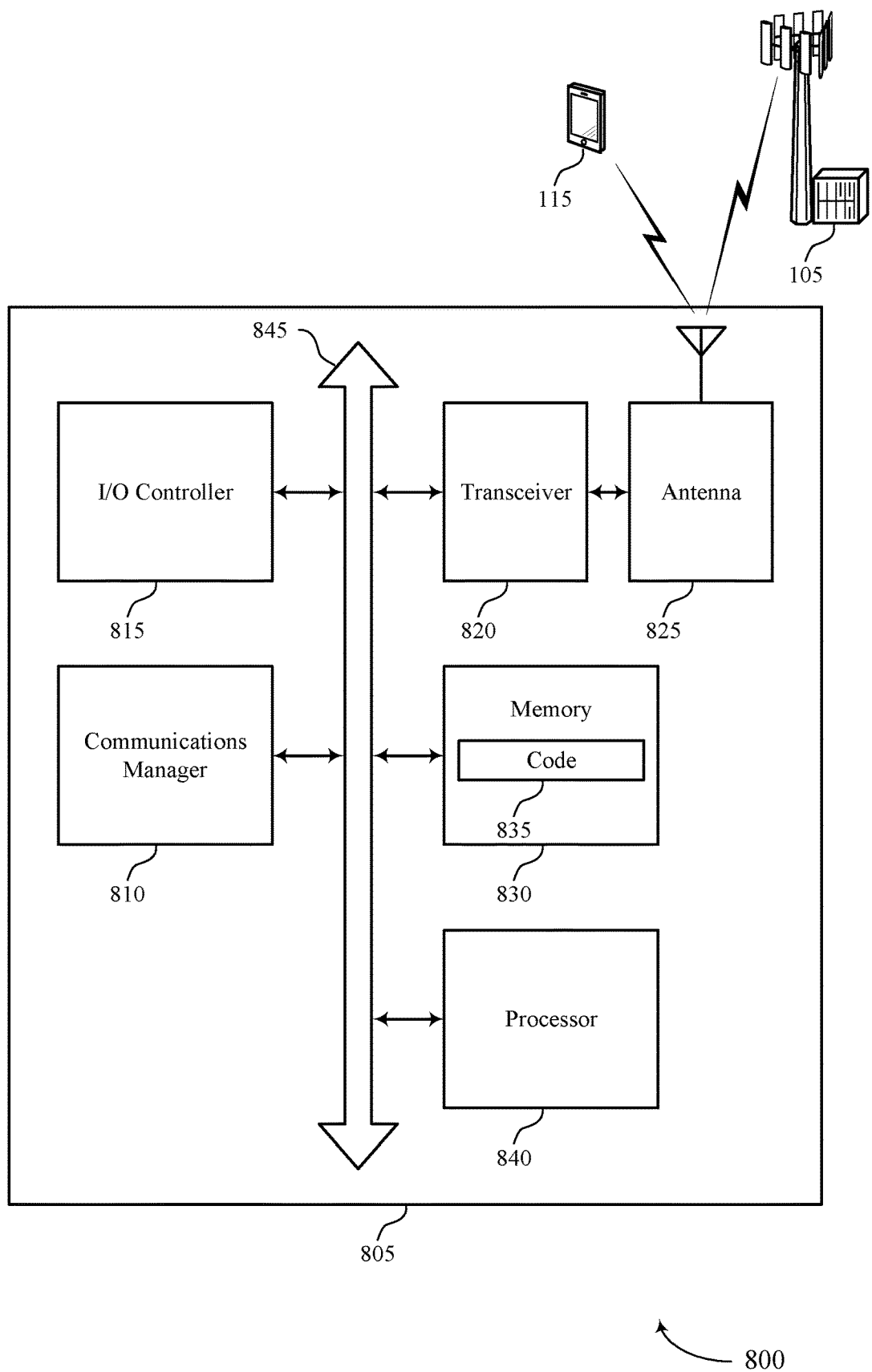
FIG. 8 shows a diagram of a system including a device that supports antenna group-specific parameter configuration in millimeter wave communications in accordance with one or more aspects of the present disclosure.

FIG. 8 shows a diagram of a system 800 including a device 805 that supports antenna group-specific parameter configuration in millimeter wave communications in accordance with one or more aspects of the present disclosure. The device 805 may be an example of or include the components of device 505, device 605, a first wireless device, or a UE as described herein. The device 805 may include components for bi-directional voice and data communications including components for transmitting and receiving communications, including a communications manager 810, an I/O controller 815, a transceiver 820, an antenna 825, memory 830, and a processor 840. These components may be in electronic communication via one or more buses (e.g., bus 845).

The communications manager 810 may receive signaling indicating a first set of antenna elements for communications with a second wireless device, the first set of antenna elements including a first number of antenna elements from one or more of a set of antenna elements of the first wireless device, and communicate with the second wireless device, using the first set of antenna elements, based on one or more transmission control parameters, where the one or more transmission control parameters may include a power control parameter for uplink transmissions via a millimeter wave frequency band to the second wireless device, and where the power control parameter may be determined based on the first number of antenna elements.

The communications manager 810 may as described herein be implemented to realize one or more potential advantages. One implementation may allow the device 805 to provide an indication of a number of antenna elements of preferred antenna groups that may allow for efficient determination of transmission control parameters for beamformed communications. Further, implementations may allow the device 805 to utilize processing resources more efficiently, among other advantages.

The I/O controller 815 may manage input and output signals for the device 805. The I/O controller 815 may also manage peripherals not integrated into the device 805. In some cases, the I/O controller 815 may represent a physical connection or port to an external peripheral. In some cases, the I/O controller 815 may utilize an operating system such as iOS®, ANDROID®, MS-DOS®, MS-WINDOWS®, OS/2®, UNIX®, LINUX®, or another known operating system. In other cases, the I/O controller 815 may represent or interact with a modem, a keyboard, a mouse, a touchscreen, or a similar device. In some cases, the I/O controller 815 may be implemented as part of a processor. In some cases, a user may interact with the device 805 via the I/O controller 815 or via hardware components controlled by the I/O controller 815.

The transceiver 820 may communicate bi-directionally, via one or more antennas, wired, or wireless links as described herein. For example, the transceiver 820 may represent a wireless transceiver and may communicate bi-directionally with another wireless transceiver. The transceiver 820 may also include a modem to modulate the packets and provide the modulated packets to the antennas for transmission, and to demodulate packets received from the antennas.

In some cases, the wireless device may include a single antenna 825. However, in some cases the device may have more than one antenna 825, which may be capable of concurrently transmitting or receiving multiple wireless transmissions.

The memory 830 may include random-access memory (RAM) and read-only memory (ROM). The memory 830 may store computer-readable, computer-executable code 835 including instructions that, when executed, cause the processor to perform various functions described herein. In some cases, the memory 830 may contain, among other things, a basic I/O system (BIOS) which may control basic hardware or software operation such as the interaction with peripheral components or devices.

The processor 840 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 840 may be configured to operate a memory array using a memory controller. In other cases, a memory controller may be integrated into the processor 840. The processor 840 may be configured to execute computer-readable instructions stored in a memory (e.g., the memory 830) to cause the device 805 to perform various functions (e.g., functions or tasks supporting antenna group-specific parameter configuration in millimeter wave communications).

The code 835 may include instructions to implement aspects of the present disclosure, including instructions to support wireless communications. The code 835 may be stored in a non-transitory computer-readable medium such as system memory or other type of memory. In some cases, the code 835 may not be directly executable by the processor 840 but may cause a computer (e.g., when compiled and executed) to perform functions described herein.

Figure 9:
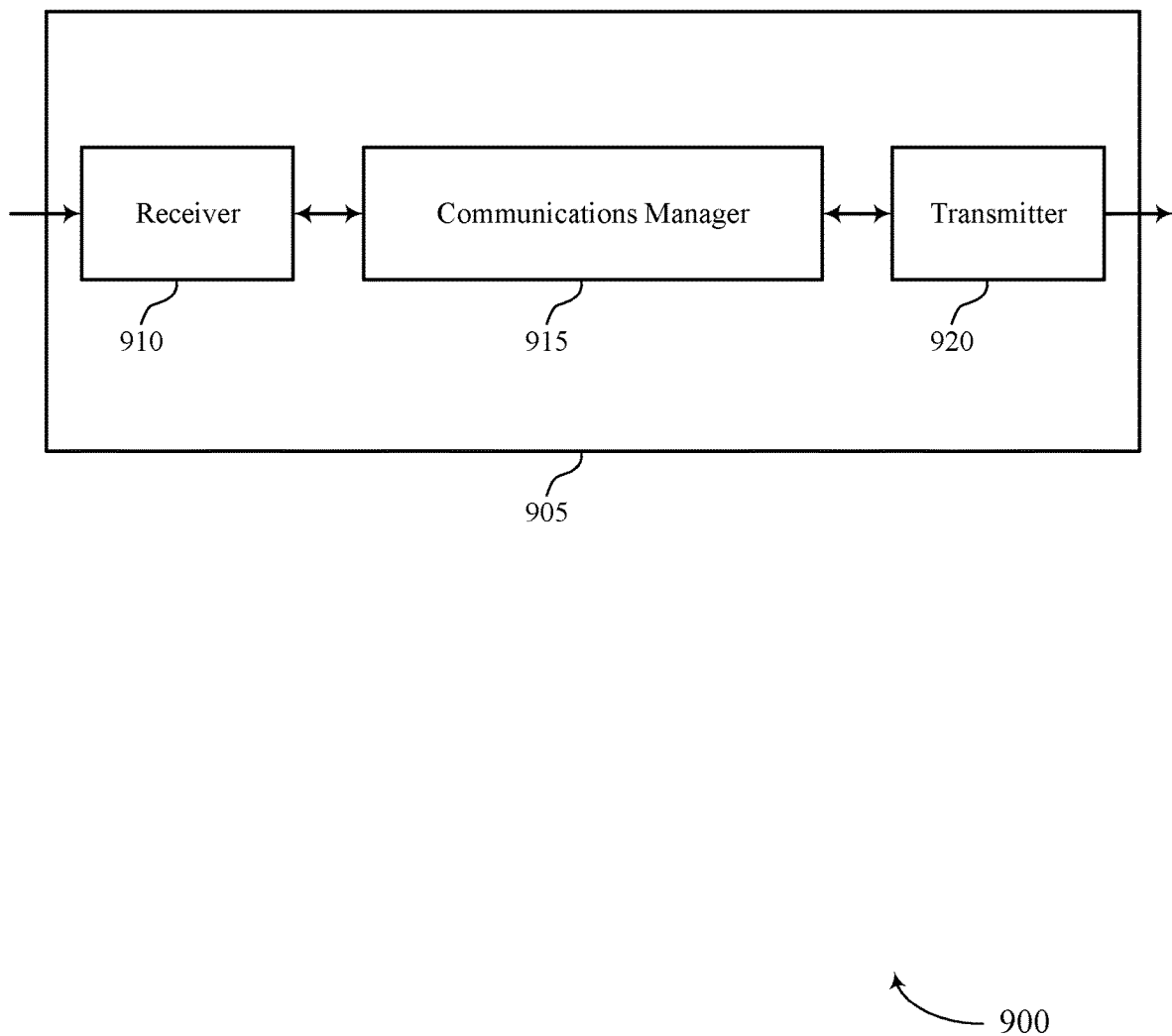
FIGS. 9 and 10 show block diagrams of devices that support antenna group-specific parameter configuration in millimeter wave communications in accordance with one or more aspects of the present disclosure.

FIG. 9 shows a block diagram 900 of a device 905 that supports antenna group-specific parameter configuration in millimeter wave communications in accordance with one or more aspects of the present disclosure. The device 905 may be an example of aspects of a second wireless device or a base station as described herein. The device 905 may include a receiver 910, a communications manager 915, and a transmitter 920. The device 905 may also include a processor. Each of these components may be in communication with one another (e.g., via one or more buses).

The receiver 910 may receive information such as packets, user data, or control information associated with various information channels (e.g., control channels, data channels, and information related to antenna group-specific parameter configuration in millimeter wave communications, etc.). Information may be passed on to other components of the device 905. The receiver 910 may be an example of aspects of the transceiver 1220 described with reference to FIG. 12. The receiver 910 may utilize a single antenna or a set of antennas.

The communications manager 915 may transmit two or more training signals to a first wireless device as part of a beam training procedure for the first wireless device, receive, from the first wireless device, an indication of a first set of antenna elements, the first set of antenna elements including a first number of antenna elements, and transmit control information that indicates digital beamforming codebook parameters to the first wireless device, the digital beamforming codebook parameters may configure a digital beamforming codebook that may be used for communications with the second wireless device, where the digital beamforming codebook parameters may be determined based on the first number of antenna elements. The communications manager 915 may be an example of aspects of the communications manager 1210 described herein.

The communications manager 915 may be an example of means for performing various aspects of configuration of antenna groups. The communications manager 915, or its sub-components, may be implemented in hardware (e.g., in communications management circuitry). The circuitry may comprise of processor, DSP, an ASIC, an FPGA or other programmable logic device, discrete gate or transistor logic, discrete hardware components, or any combination thereof designed to perform the functions described in the present disclosure.

In another implementation, the communications manager 915, or its sub-components, may be implemented in code (e.g., as communications management software or firmware) executed by a processor, or any combination thereof. If implemented in code executed by a processor, the functions of the communications manager 915, or its sub-components may be executed by a general-purpose processor, a DSP, an ASIC, an FPGA or other programmable logic device.

In some examples, the communications manager 915 may be configured to perform various operations (e.g., receiving, measuring, transmitting) using or otherwise in cooperation with the receiver 910, the transmitter 920, or both.

The communications manager 915, or its sub-components, may be physically located at various positions, including being distributed such that portions of functions are implemented at different physical locations by one or more physical components. In some examples, the communications manager 915, or its sub-components, may be a separate and distinct component in accordance with various aspects of the present disclosure. In some examples, the communications manager 915, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 920 may transmit signals generated by other components of the device 905. In some examples, the transmitter 920 may be collocated with a receiver 910 in a transceiver module. For example, the transmitter 920 may be an example of aspects of the transceiver 1220 described with reference to FIG. 12. The transmitter 920 may utilize a single antenna or a set of antennas.

Figure 10:
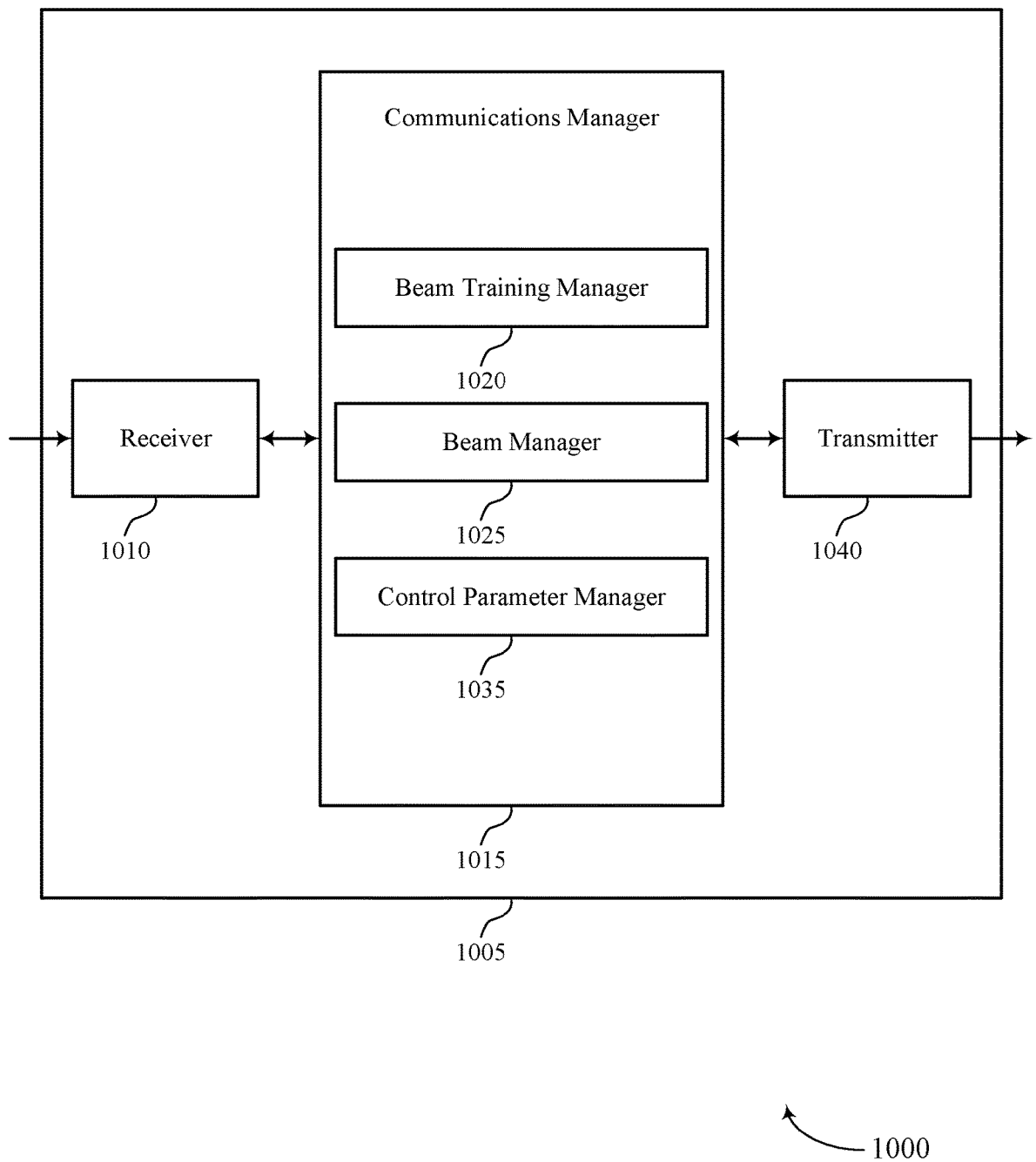

FIG. 10 shows a block diagram 1000 of a device 1005 that supports antenna group-specific parameter configuration in millimeter wave communications in accordance with one or more aspects of the present disclosure. The device 1005 may be an example of aspects of a device 905, a first wireless device, or a base station as described herein. The device 1005 may include a receiver 1010, a communications manager 1015, and a transmitter 1040. The device 1005 may also include a processor. Each of these components may be in communication with one another (e.g., via one or more buses).

The receiver 1010 may receive information such as packets, user data, or control information associated with various information channels (e.g., control channels, data channels, and information related to antenna group-specific parameter configuration in millimeter wave communications, etc.). Information may be passed on to other components of the device 1005. The receiver 1010 may be an example of aspects of the transceiver 1220 described with reference to FIG. 12. The receiver 1010 may utilize a single antenna or a set of antennas.

The communications manager 1015 may be an example of aspects of the communications manager 915 as described herein. The communications manager 1015 may include a beam training manager 1020, a beam manager 1025, and a control parameter manager 1035. The communications manager 1015 may be an example of aspects of the communications manager 1210 described herein.

The beam training manager 1020 may transmit two or more training signals to a first wireless device as part of a beam training procedure for the first wireless device.

The beam manager 1025 may receive, from the first wireless device, an indication of a first set of antenna elements, the first set of antenna elements including a first number of antenna elements.

The control parameter manager 1035 may transmit control information that indicates digital beamforming codebook parameters to the first wireless device, the digital beamforming codebook parameters configuring a digital beamforming codebook that may be used for communications with the second wireless device, where the digital beamforming codebook parameters may be determined based on the first number of antenna elements.

The transmitter 1040 may transmit signals generated by other components of the device 1005. In some examples, the transmitter 1040 may be collocated with a receiver 1010 in a transceiver module. For example, the transmitter 1040 may be an example of aspects of the transceiver 1220 described with reference to FIG. 12. The transmitter 1040 may utilize a single antenna or a set of antennas.

Figure 11:
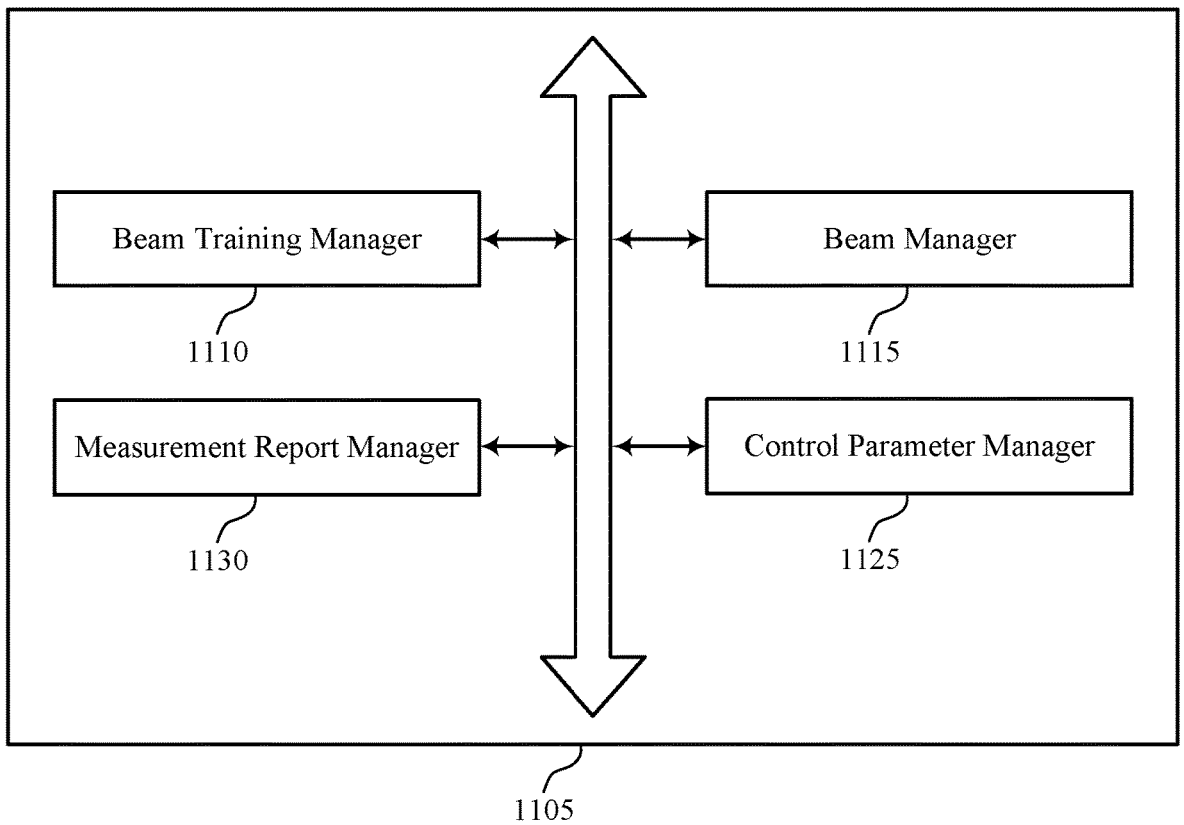
FIG. 11 shows a block diagram of a communications manager that supports antenna group-specific parameter configuration in millimeter wave communications in accordance with one or more aspects of the present disclosure.

FIG. 11 shows a block diagram 1100 of a communications manager 1105 that supports antenna group-specific parameter configuration in millimeter wave communications in accordance with one or more aspects of the present disclosure. The communications manager 1105 may be an example of aspects of a communications manager 915, a communications manager 1015, or a communications manager 1210 described herein. The communications manager 1105 may include a beam training manager 1110, a beam manager 1115, a control parameter manager 1125, and a measurement report manager 1130. Each of these modules may communicate, directly or indirectly, with one another (e.g., via one or more buses).

The beam training manager 1110 may transmit two or more training signals to a first wireless device as part of a beam training procedure for the first wireless device.

The beam manager 1115 may receive, from the first wireless device, an indication of a first set of antenna elements, the first set of antenna elements including a first number of antenna elements. In some examples, the beam manager 1115 may receive the uplink transmissions from the first wireless device based on the one or more receive parameters. In some cases, communications may use a millimeter wave frequency band that includes frequencies that are greater than 52.6 GHz. In some cases, the first wireless device is a UE or a CPE in a wireless communications system and the second wireless device is a base station, a CPE, a relay device, a router, a repeater, or an IAB node in the wireless communications system.

The control parameter manager 1125 may transmit control information that indicates digital beamforming codebook parameters to the first wireless device, the digital beamforming codebook parameters may configure a digital beamforming codebook that may be used for communications with the second wireless device, where the digital beamforming codebook parameters may be determined based on the first number of antenna elements. In some examples, the control parameter manager 1125 may receive, from the first wireless device, a power control parameter (e.g., $P_{cmax}$) for uplink transmissions from the first wireless device that is associated with the first number of antenna elements. In some examples, the control parameter manager 1125 may determine one or more receive parameters for the uplink transmissions based on the power control parameter. In some cases, the one or more receive parameters are determined based on a mapping between the first number of antenna elements and associated receive parameters.

The measurement report manager 1130 may receive one or more measurement reports, such as CSI measurement reports as part of a beam training procedure. In some cases, the indication of the first set of antenna elements is received with a measurement report from the first wireless device, and where the determining the digital beamforming codebook parameters are further based on the measurement report. In some cases, the measurement report is received from the first wireless device via RRC signaling.

Figure 12:
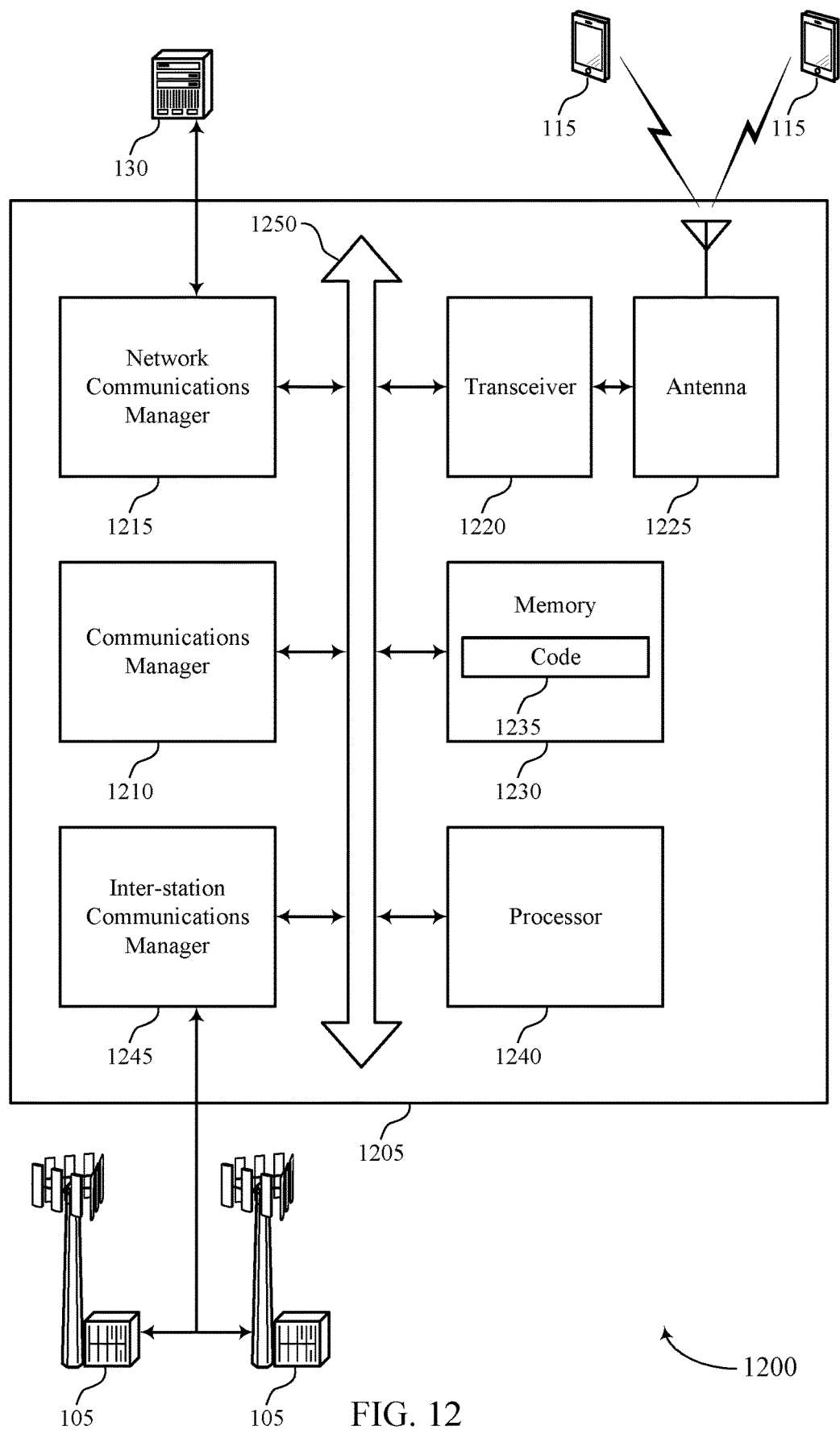
FIG. 12 shows a diagram of a system including a device that supports antenna group-specific parameter configuration in millimeter wave communications in accordance with one or more aspects of the present disclosure.

FIG. 12 shows a diagram of a system 1200 including a device 1205 that supports antenna group-specific parameter configuration in millimeter wave communications in accordance with one or more aspects of the present disclosure.

The device 1205 may be an example of or include the components of device 905, device 1005, a second wireless device, or a base station as described herein. The device 1205 may include components for bi-directional voice and data communications including components for transmitting and receiving communications, including a communications manager 1210, a network communications manager 1215, a transceiver 1220, an antenna 1225, memory 1230, a processor 1240, and an inter-station communications manager 1245. These components may be in electronic communication via one or more buses (e.g., bus 1250).

The communications manager 1210 may transmit two or more training signals to a first wireless device as part of a beam training procedure for the first wireless device, receive, from the first wireless device, an indication of a first set of antenna elements, the first set of antenna elements including a first number of antenna elements, and transmit control information that indicates digital beamforming codebook parameters to the first wireless device, the digital beamforming codebook parameters may configure a digital beamforming codebook that may be used for communications with the second wireless device, where the digital beamforming codebook parameters may be determined based on the first number of antenna elements.

The network communications manager 1215 may manage communications with the core network (e.g., via one or more wired backhaul links). For example, the network communications manager 1215 may manage the transfer of data communications for client devices, such as one or more UEs 115.

The transceiver 1220 may communicate bi-directionally, via one or more antennas, wired, or wireless links as described herein. For example, the transceiver 1220 may represent a wireless transceiver and may communicate bi-directionally with another wireless transceiver. The transceiver 1220 may also include a modem to modulate the packets and provide the modulated packets to the antennas for transmission, and to demodulate packets received from the antennas.

In some cases, the wireless device may include a single antenna 1225. However, in some cases the device may have more than one antenna 1225, which may be capable of concurrently transmitting or receiving multiple wireless transmissions.

The memory 1230 may include RAM, ROM, or a combination thereof. The memory 1230 may store computer-readable code 1235 including instructions that, when executed by a processor (e.g., the processor 1240) cause the device to perform various functions described herein. In some cases, the memory 1230 may contain, among other things, a BIOS which may control basic hardware or software operation such as the interaction with peripheral components or devices.

The processor 1240 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1240 may be configured to operate a memory array using a memory controller. In some cases, a memory controller may be integrated into processor 1240. The processor 1240 may be configured to execute computer-readable instructions stored in a memory (e.g., the memory 1230) to cause the device 1205 to perform various functions (e.g., functions or tasks supporting antenna group-specific parameter configuration in millimeter wave communications).

The inter-station communications manager 1245 may manage communications with other base station 105, and may include a controller or scheduler for controlling communications with UEs 115 in cooperation with other base stations 105. For example, the inter-station communications manager 1245 may coordinate scheduling for transmissions to UEs 115 for various interference mitigation techniques such as beamforming or joint transmission. In some examples, the inter-station communications manager 1245 may provide an X2 interface within an LTE/LTE-A wireless communication network technology to provide communication between base stations 105.

The code 1235 may include instructions to implement aspects of the present disclosure, including instructions to support wireless communications. The code 1235 may be stored in a non-transitory computer-readable medium such as system memory or other type of memory. In some cases, the code 1235 may not be directly executable by the processor 1240 but may cause a computer (e.g., when compiled and executed) to perform functions described herein.

Figure 13:
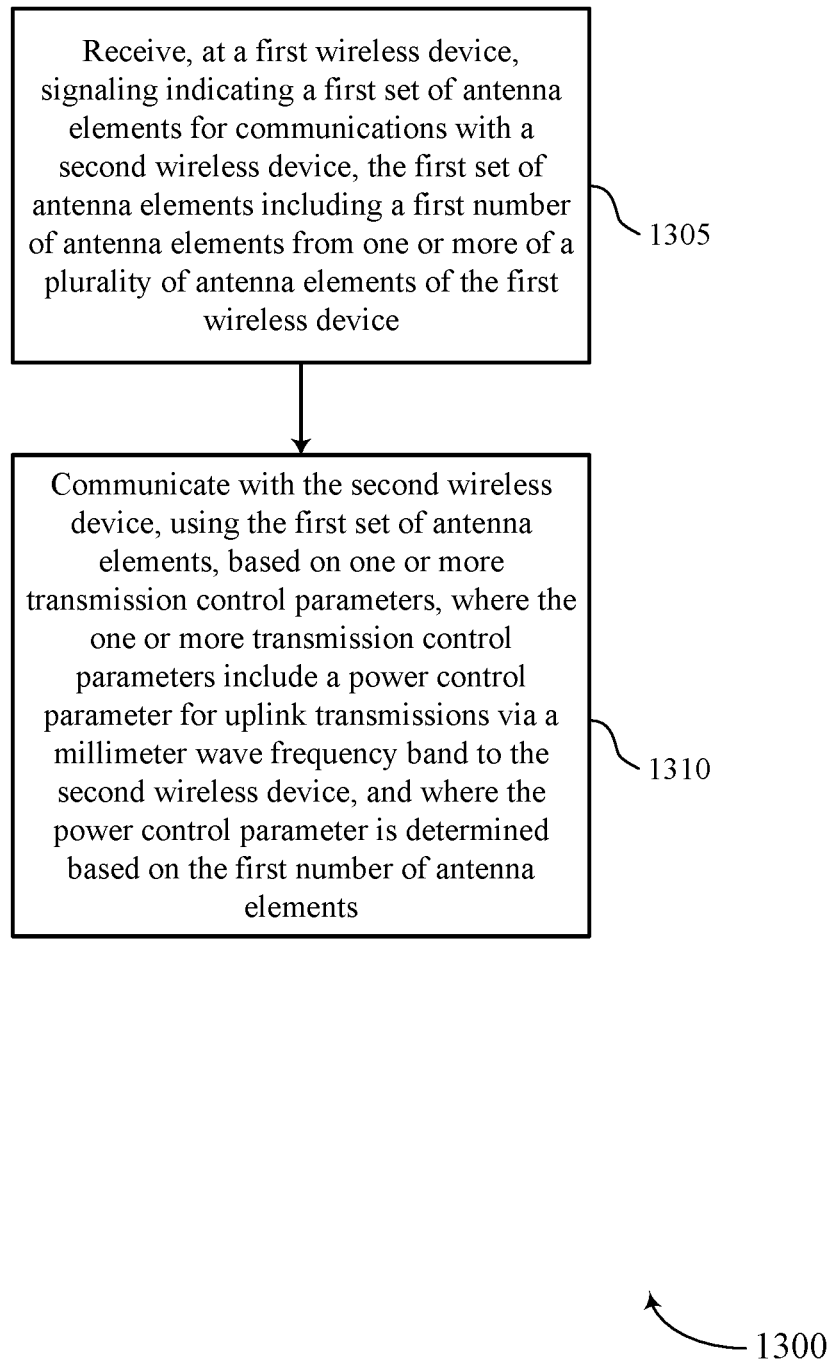
FIGS. 13 through 17 show flowcharts illustrating methods that support antenna group-specific parameter configuration in millimeter wave communications in accordance with one or more aspects of the present disclosure.

FIG. 13 shows a flowchart illustrating a method 1300 that supports antenna group-specific parameter configuration in millimeter wave communications in accordance with one or more aspects of the present disclosure. The operations of method 1300 may be implemented by a first wireless device or its components as described herein. For example, the operations of method 1300 may be performed by a communications manager as described with reference to FIGS. 5 through 8. In some examples, a first wireless device may execute a set of instructions to control the functional elements of the first wireless device to perform the functions described herein. Additionally or alternatively, a first wireless device may perform aspects of the functions described herein using special-purpose hardware.

At 1305, the first wireless device may receive signaling indicating a first set of antenna elements for communications with a second wireless device, the first set of antenna elements including a first number of antenna elements from one or more of a set of antenna elements of the first wireless device. In some cases, the one or more transmission control parameters may include a power control parameter for uplink transmissions via a millimeter wave frequency band to the second wireless device, and the power control parameter may be determined based on the first number of antenna elements. The operations of 1305 may be performed according to the methods described herein. In some examples, aspects of the operations of 1305 may be performed by an antenna selection manager as described with reference to FIGS. 5 through 8.

At 1310, the first wireless device may communicate with the second wireless device, using the first set of antenna elements, based on one or more transmission control parameters. The operations of 1310 may be performed according to the methods described herein. In some examples, aspects of the operations of 1310 may be performed by a beam manager as described with reference to FIGS. 5 through 8.

Figure 14:
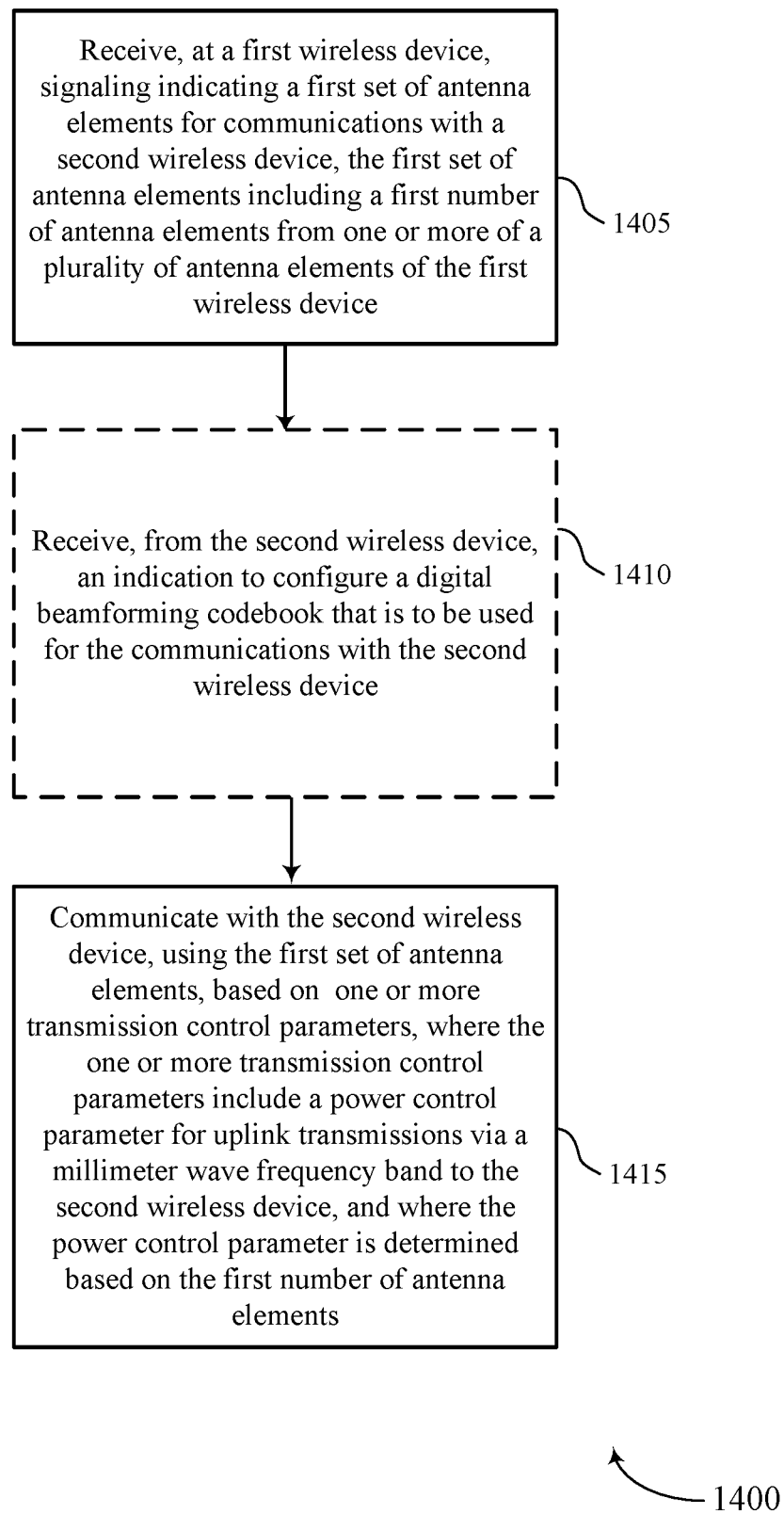

FIG. 14 shows a flowchart illustrating a method 1400 that supports antenna group-specific parameter configuration in millimeter wave communications in accordance with one or more aspects of the present disclosure. The operations of method 1400 may be implemented by a first wireless device or its components as described herein. For example, the operations of method 1400 may be performed by a communications manager as described with reference to FIGS. 5 through 8. In some examples, a first wireless device may execute a set of instructions to control the functional elements of the first wireless device to perform the functions described herein. Additionally or alternatively, a first wireless device may perform aspects of the functions described herein using special-purpose hardware.

At 1405, the first wireless device may receive signaling indicating a first set of antenna elements for communications with a second wireless device, the first set of antenna elements including a first number of antenna elements from one or more of a set of antenna elements of the first wireless device. The operations of 1405 may be performed according to the methods described herein. In some examples, aspects of the operations of 1405 may be performed by an antenna selection manager as described with reference to FIGS. 5 through 8.

At 1410, the first wireless device may receive, from the second wireless device, an indication to configure a digital beamforming codebook that is to be used for the communications with the second wireless device, where one or more parameters associated with the digital beamforming codebook are determined based on the first number of antenna elements. The operations of 1410 may be performed according to the methods described herein. In some examples, aspects of the operations of 1410 may be performed by a digital beamforming manager as described with reference to FIGS. 5 through 8.

At 1415, the first wireless device may communicate with the second wireless device, using the first set of antenna elements, based on one or more transmission control parameters. In some cases, the one or more transmission control parameters may include a power control parameter for uplink transmissions via a millimeter wave frequency band to the second wireless device, and the power control parameter may be determined based on the first number of antenna elements. The operations of 1415 may be performed according to the methods described herein. In some examples, aspects of the operations of 1420 may be performed by a beam manager as described with reference to FIGS. 5 through 8.

Figure 15:
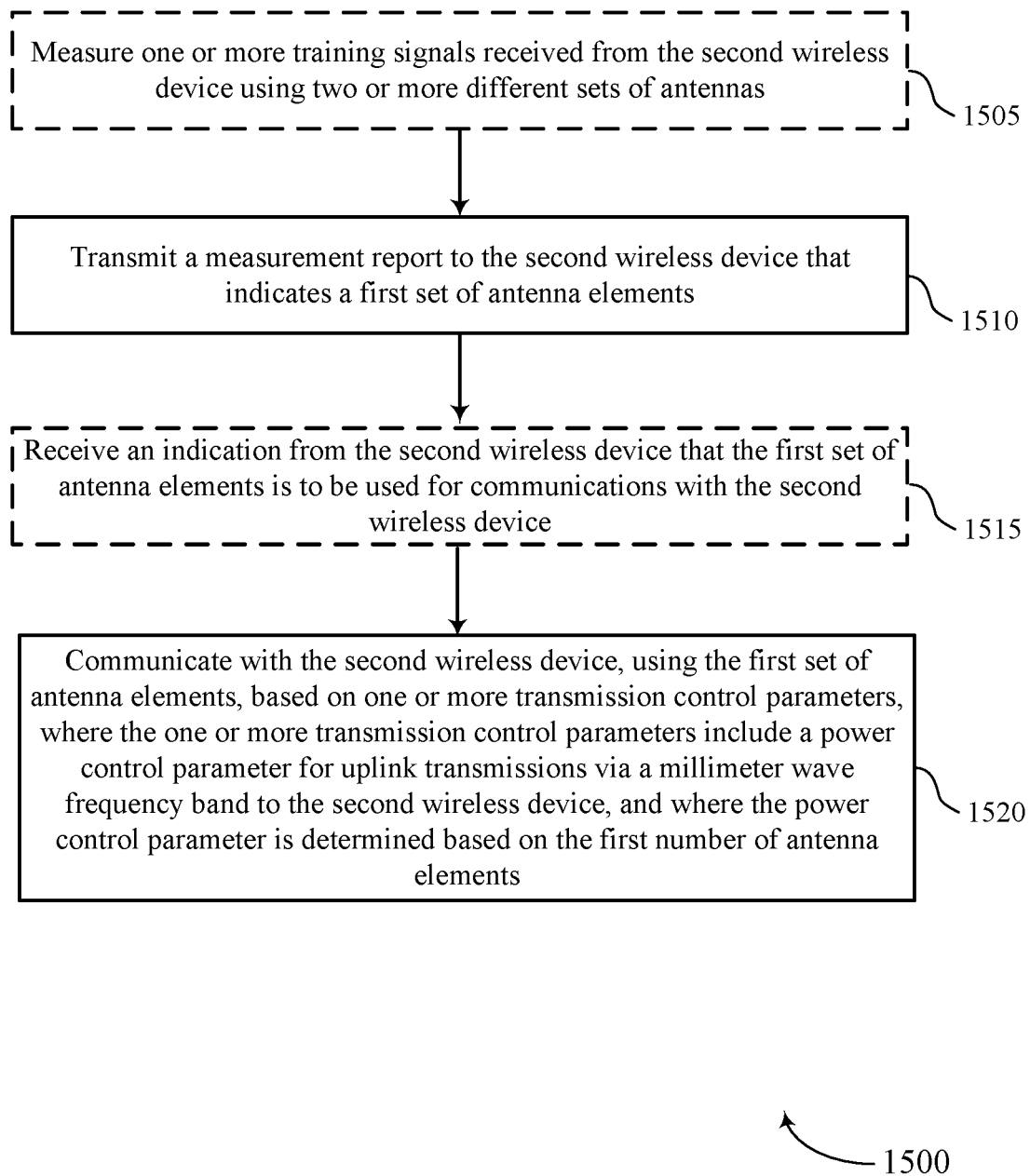

FIG. 15 shows a flowchart illustrating a method 1500 that supports antenna group-specific parameter configuration in millimeter wave communications in accordance with one or more aspects of the present disclosure. The operations of method 1500 may be implemented by a first wireless device or its components as described herein. For example, the operations of method 1500 may be performed by a communications manager as described with reference to FIGS. 5 through 8. In some examples, a first wireless device may execute a set of instructions to control the functional elements of the first wireless device to perform the functions described herein. Additionally or alternatively, a first wireless device may perform aspects of the functions described herein using special-purpose hardware.

At 1505, the first wireless device may measure one or more training signals received from the second wireless device using two or more different sets of antennas. The operations of 1505 may be performed according to the methods described herein. In some examples, aspects of the operations of 1505 may be performed by a measurement component as described with reference to FIGS. 5 through 8.

At 1510, the first wireless device may transmit a measurement report to the second wireless device that indicates the first set of antenna elements. The operations of 1510 may be performed according to the methods described herein. In some examples, aspects of the operations of 1510 may be performed by a measurement component as described with reference to FIGS. 5 through 8.

At 1515, the first wireless device may receive an indication from the second wireless device that the first set of antenna elements is to be used for communications with the second wireless device. The operations of 1515 may be performed according to the methods described herein. In some examples, aspects of the operations of 1515 may be performed by a beam manager as described with reference to FIGS. 5 through 8.

At 1520, the first wireless device may communicate with the second wireless device, using the first set of antenna elements, based on one or more transmission control parameters. In some cases, the one or more transmission control parameters may include a power control parameter for uplink transmissions via a millimeter wave frequency band to the second wireless device, and the power control parameter may be determined based on the first number of antenna elements. The operations of 1520 may be performed according to the methods described herein. In some examples, aspects of the operations of 1520 may be performed by a beam manager as described with reference to FIGS. 5 through 8.

Figure 16:
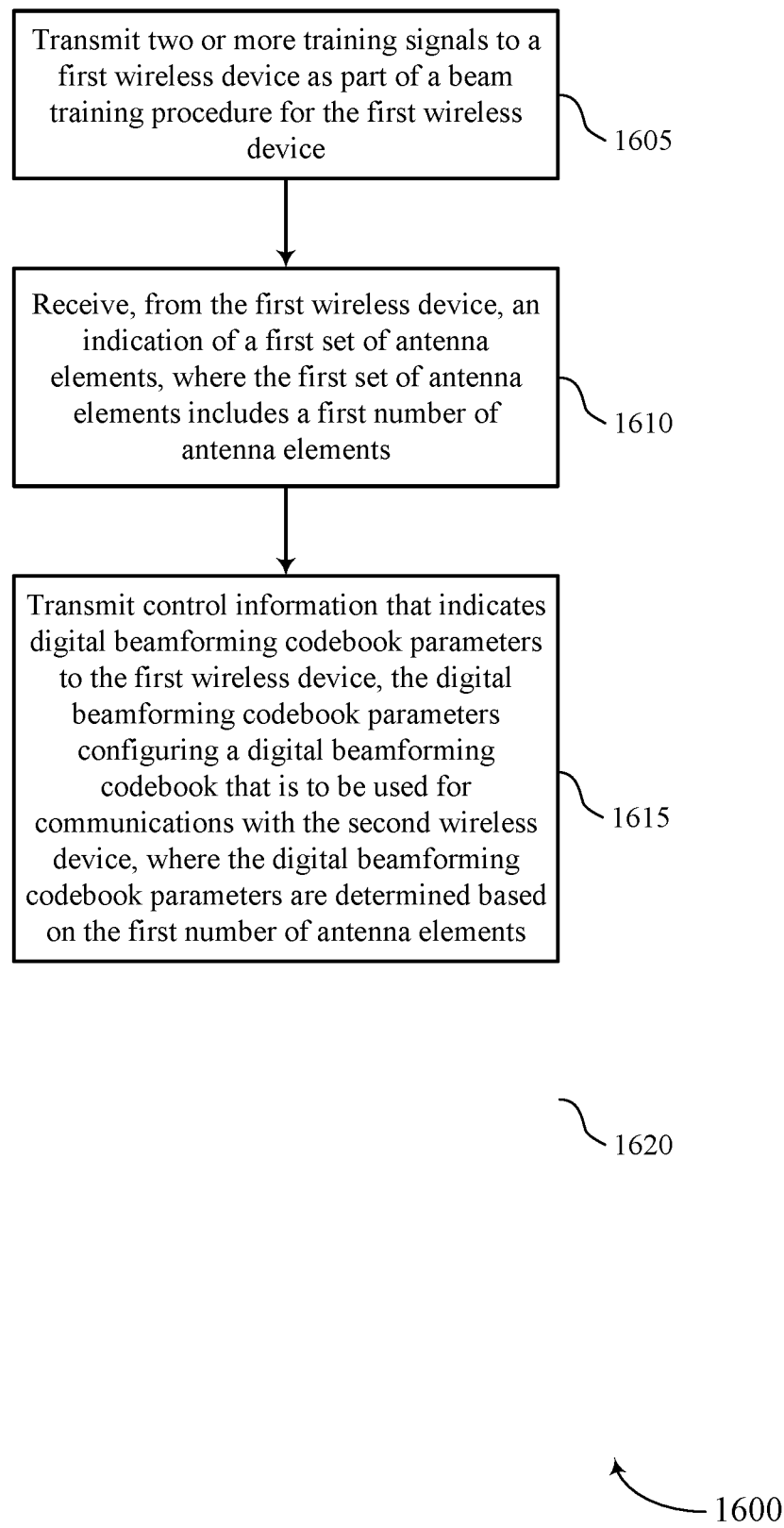

FIG. 16 shows a flowchart illustrating a method 1600 that supports antenna group-specific parameter configuration in millimeter wave communications in accordance with one or more aspects of the present disclosure. The operations of method 1600 may be implemented by a second wireless device or its components as described herein. For example, the operations of method 1600 may be performed by a communications manager as described with reference to FIGS. 9 through 12. In some examples, a second wireless device may execute a set of instructions to control the functional elements of the second wireless device to perform the functions described herein. Additionally or alternatively, a second wireless device may perform aspects of the functions described herein using special-purpose hardware.

At 1605, the second wireless device may transmit two or more training signals to a first wireless device as part of a beam training procedure for the first wireless device. The operations of 1605 may be performed according to the methods described herein. In some examples, aspects of the operations of 1605 may be performed by a beam training manager as described with reference to FIGS. 9 through 12.

At 1610, the second wireless device may receive, from the first wireless device, an indication of a first set of antenna elements, where the first set of antenna elements includes a first number of antenna elements. The operations of 1610 may be performed according to the methods described herein. In some examples, aspects of the operations of 1610 may be performed by a beam manager as described with reference to FIGS. 9 through 12.

At 1615, the second wireless device may transmit control information that indicates digital beamforming codebook parameters to the first wireless device, the digital beamforming codebook parameters may configure a digital beamforming codebook that may be used for communications with the second wireless device. In some cases, the digital beamforming codebook parameters may be determined based on the first number of antenna elements. The operations of 1620 may be performed according to the methods described herein. In some examples, aspects of the operations of 1620 may be performed by a control parameter manager as described with reference to FIGS. 9 through 12.

Figure 17:
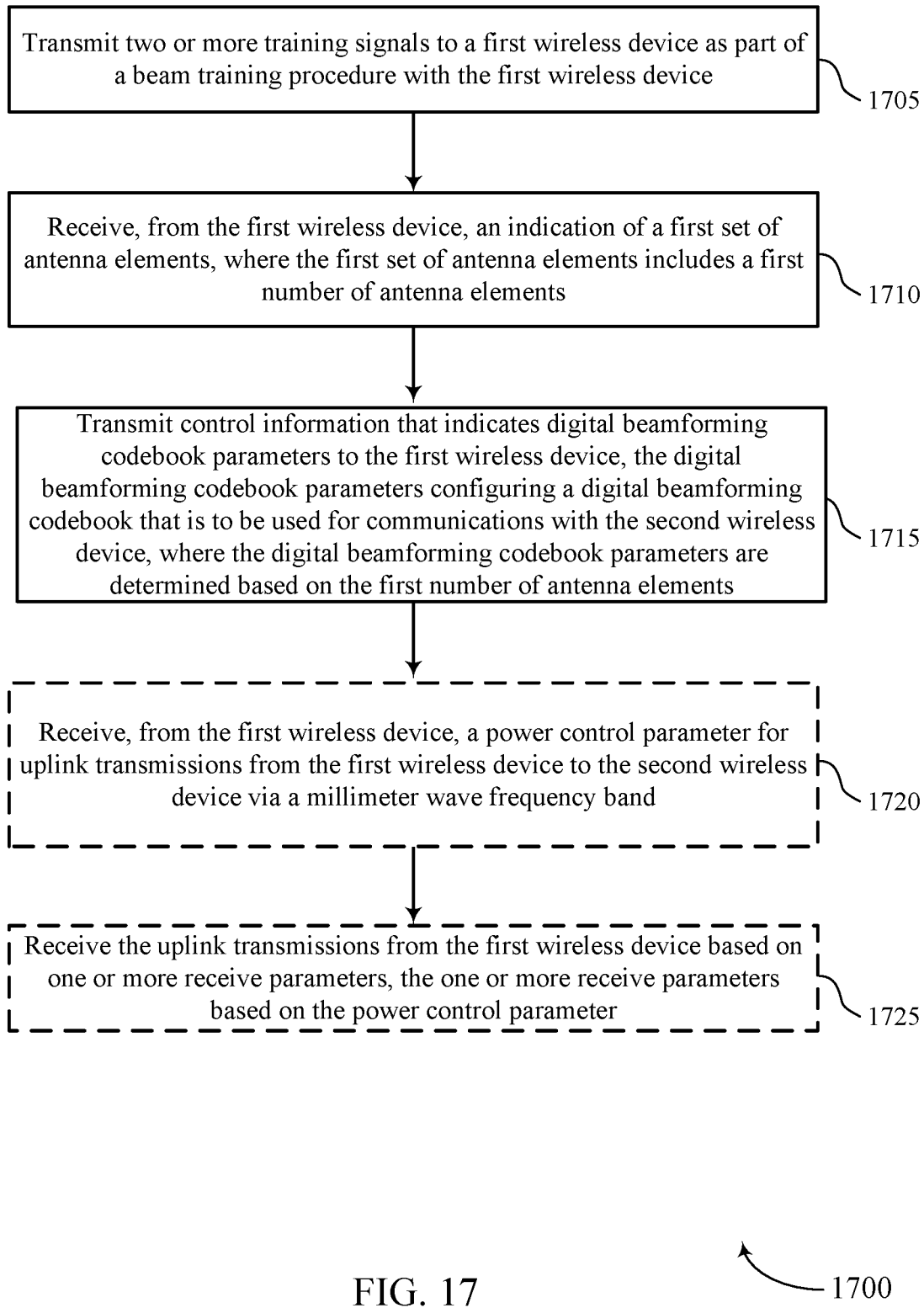

FIG. 17 shows a flowchart illustrating a method 1700 that supports antenna group-specific parameter configuration in millimeter wave communications in accordance with one or more aspects of the present disclosure. The operations of method 1700 may be implemented by a second wireless device or its components as described herein. For example, the operations of method 1700 may be performed by a communications manager as described with reference to FIGS. 9 through 12. In some examples, a second wireless device may execute a set of instructions to control the functional elements of the second wireless device to perform the functions described herein. Additionally or alternatively, a second wireless device may perform aspects of the functions described herein using special-purpose hardware.

At 1705, the second wireless device may transmit two or more training signals to a first wireless device as part of a beam training procedure for the first wireless device. The operations of 1705 may be performed according to the methods described herein. In some examples, aspects of the operations of 1705 may be performed by a beam training manager as described with reference to FIGS. 9 through 12.

At 1710, the second wireless device may receive, from the first wireless device, an indication of a first set of antenna elements, where the first set of antenna elements includes a first number of antenna elements. The operations of 1710 may be performed according to the methods described herein. In some examples, aspects of the operations of 1710 may be performed by a beam manager as described with reference to FIGS. 9 through 12.

At 1715, the second wireless device may transmit control information that indicates digital beamforming codebook parameters to the first wireless device, the digital beamforming codebook parameters configuring a digital beamforming codebook that may be used for communications with the second wireless device. In some cases, the digital beamforming codebook parameters may be determined based on the first number of antenna elements. The operations of 1715 may be performed according to the methods described herein. In some examples, aspects of the operations of 1715 may be performed by a control parameter manager as described with reference to FIGS. 9 through 12.

At 1720, the second wireless device may receive, from the first wireless device, a power control parameter for uplink transmissions from the first wireless device that is associated with the first number of antenna elements. The operations of 1720 may be performed according to the methods described herein. In some examples, aspects of the operations of 1720 may be performed by a control parameter manager as described with reference to FIGS. 9 through 12.

At 1725, the second wireless device may receive the uplink transmissions from the first wireless device based on one or more receive parameters, the one or more receive parameters based on the power control parameter. The operations of 1725 may be performed according to the methods described herein. In some examples, aspects of the operations of 1725 may be performed by a beam manager as described with reference to FIGS. 9 through 12.

It should be noted that the methods described herein describe possible implementations, and that the operations and the steps may be rearranged or otherwise modified and that other implementations are possible. Further, aspects from two or more of the methods may be combined.

Aspect 1: A method for wireless communications, including: receiving, at a first wireless device, signaling indicating a first set of antenna elements for communications with a second wireless device, the first set of antenna elements including a first number of antenna elements from one or more of a plurality of antenna elements of the first wireless device; and communicating with the second wireless device, using the first set of antenna elements, based on one or more transmission control parameters, where the one or more transmission control parameters include a power control parameter for uplink transmissions via a millimeter wave frequency band to the second wireless device, and where the power control parameter is determined based on the first number of antenna elements.

Aspect 2: The method of aspect 1, where the one or more transmission control parameters include an MCS dependent phase compensation parameter for downlink transmissions received from the second wireless device via a millimeter wave frequency band, where the MCS-dependent phase compensation parameter is determined based on the first number of antenna elements.

Aspect 3: The method of any of aspects 1 to 2, further including: receiving, from the second wireless device, an indication to configure a digital beamforming codebook that is to be used for the communications with the second wireless device, wherein one or more parameters associated with the digital beamforming codebook are determined based on the first number of antenna elements.

Aspect 4: The method of any of aspects 1 to 3, where the receiving includes: measuring one or more training signals received from the second wireless device using two or more different sets of antennas; transmitting a measurement report to the second wireless device that indicates the first set of antenna elements; and receiving an indication from the second wireless device that the first set of antenna elements is to be used for communications with the second wireless device.

Aspect 5: The method of aspect 4, where the measurement report is transmitted to the second wireless device via radio resource control (RRC) signaling.

Aspect 6: The method of any of aspects 1 to 5, where the one or more transmission control parameters are determined based on a mapping between the first number of antenna elements and associated transmission control parameters.

Aspect 7: An apparatus including at least one means for performing a method of any of aspects 1 to 6.

Aspect 8: An apparatus for wireless communications including a processor; memory in electronic communication with the processor; and instructions stored in the memory and executable by the processor to cause the apparatus to perform a method of any of aspects 1 to 6.

Aspect 9: A non-transitory computer-readable medium storing code for wireless communications, the code including instructions executable by a processor to perform a method of any of aspects 1 to 6.

Aspect 10: A method for wireless communication at a second wireless device, including: transmitting two or more training signals to a first wireless device as part of a beam training procedure for the first wireless device; receiving, from the first wireless device, an indication of a first set of antenna elements that are selected by the first wireless device for communications with the second wireless device, the first set of antenna elements including a first number of antenna elements from one or more of a plurality of antenna elements of the first wireless device; and transmitting control information that indicates digital beamforming codebook parameters to the first wireless device, the digital beamforming codebook parameters configuring a digital beamforming codebook that is to be used for communications with the second wireless device, where the digital beamforming codebook parameters are determined based on the first number of antenna elements.

Aspect 11: The method of aspect 10, further including: receiving, from the first wireless device, a power control parameter for uplink transmissions from the first wireless device that is associated with the first number of antenna elements; and receiving the uplink transmissions from the first wireless device based on one or more receive parameters, the one or more receive parameters based on the power control parameter.

Aspect 12: The method of any of aspects 10 to 11, where the one or more receive parameters are determined based on a mapping between the first number of antenna elements and associated receive parameters.

Aspect 13: The method of any of aspects 10 to 12, where the indication of the first set of antenna elements is received with a measurement report from the first wireless device, and where the determining the digital beamforming codebook parameters are further based on the measurement report.

Aspect 14: The method of aspect 13, where the measurement report is received from the first wireless device via RRC signaling.

Aspect 15: The method of any of aspects 10 to 14, where the first wireless device is a UE or a CPE in a wireless communications system and the second wireless device is a base station, a CPE, a relay device, a router, a repeater, or an IAB node in the wireless communications system.

Aspect 16: An apparatus including at least one means for performing a method of any of aspects 10 to 15.

Aspect 17: An apparatus for wireless communications including a processor; memory in electronic communication with the processor; and instructions stored in the memory and executable by the processor to cause the apparatus to perform a method of any of aspects 10 to 15.

Aspect 18: A non-transitory computer-readable medium storing code for wireless communications, the code including instructions executable by a processor to perform a method of any of examples 10 to 15.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communications, comprising:
   receiving, at a first wireless device, signaling indicating a first set of antenna elements for communications with a second wireless device and indicating one or more transmission control parameters corresponding to an indicated quantity of antenna elements in the first set of antenna elements, the first set of antenna elements including one or more of a plurality of antenna elements of the first wireless device; and
   communicating with the second wireless device, using the first set of antenna elements, based at least in part on the one or more transmission control parameters, the one or more transmission control parameters including a power control parameter for uplink transmissions via a millimeter wave frequency band to the second wireless device, and the power control parameter being determined based at least in part on the indicated quantity of antenna elements in the first set of antenna elements.

2. The method of claim 1, wherein:
   the one or more transmission control parameters include a modulation and coding scheme (MCS)-dependent phase compensation parameter for downlink transmissions received from the second wireless device via the millimeter wave frequency band; and
   the MCS-dependent phase compensation parameter is determined based on the indicated quantity of antenna elements.

3. The method of claim 1, further comprising:
   receiving, from the second wireless device, an indication to configure a digital beamforming codebook that is to be used for the communications with the second wireless device, wherein one or more parameters associated with the digital beamforming codebook are determined based on the indicated quantity of antenna elements.

4. The method of claim 1, the receiving comprising:
   measuring one or more training signals received from the second wireless device using two or more different sets of antennas;
   transmitting a measurement report to the second wireless device that indicates the first set of antenna elements; and receiving an indication from the second wireless device that the first set of antenna elements is to be used for the communications with the second wireless device.

5. The method of claim 4, wherein the measurement report is transmitted to the second wireless device via radio resource control (RRC) signaling.

6. The method of claim 1, wherein the one or more transmission control parameters are determined based at least in part on a mapping between the indicated quantity of antenna elements and associated transmission control parameters.

7. The method of claim 1, wherein the first wireless device is a user equipment (UE) or a customer premises equipment (CPE) in a wireless communications system and the second wireless device is a base station, a CPE, a relay device, a router, a repeater, or an integrated access and backhaul (IAB) node in the wireless communications system.

8. A method for wireless communication at a second wireless device, comprising:
transmitting two or more training signals to a first wireless device as part of a beam training procedure for the first wireless device;
receiving, from the first wireless device, an indication of a first set of antenna elements and one or more transmission control parameters corresponding to an indicated quantity of antenna elements in the first set of antenna elements; and
transmitting control information that indicates digital beamforming codebook parameters to the first wireless device, the digital beamforming codebook parameters configuring a digital beamforming codebook that is to be used for communications with the second wireless device, the digital beamforming codebook parameters determined based at least in part on the one or more transmission control parameters corresponding to the indicated quantity of antenna elements in the first set of antenna elements.

9. The method of claim 8, further comprising:
receiving, from the first wireless device, a power control parameter for uplink transmissions from the first wireless device that is associated with the one or more transmission control parameters corresponding to the indicated quantity of antenna elements; and
receiving the uplink transmissions from the first wireless device based at least in part on one or more receive parameters, the one or more receive parameters based at least in part on the power control parameter.

10. The method of claim 9, wherein the one or more receive parameters are determined based at least in part on a mapping between the indicated quantity of antenna elements and associated receive parameters.

11. The method of claim 8, wherein the indication of the first set of antenna elements is received with a measurement report from the first wireless device, and the determining the digital beamforming codebook parameters is further based at least in part on the measurement report.

12. The method of claim 11, wherein the measurement report is received from the first wireless device via radio resource control (RRC) signaling.

13. The method of claim 8, wherein the first wireless device is a user equipment (UE) or a customer premises equipment (CPE) in a wireless communications system and the second wireless device is a base station, a CPE, a relay device, a router, a repeater, or an integrated access and backhaul (IAB) node in the wireless communications system.

14. An apparatus for wireless communications, comprising:
one or more processors; and
one or more memories coupled with the one or more processors, the one or more processors configured to cause the apparatus to:
receive, at a first wireless device, signaling that indicates a first set of antenna elements for communications with a second wireless device and that indicates one or more transmission control parameters that correspond to an indicated quantity of antenna elements in the first set of antenna elements, the first set of antenna elements includes one or more of a plurality of antenna elements of the first wireless device; and
communicate with the second wireless device through use of the first set of antenna elements, based at least in part on the one or more transmission control parameters, wherein the one or more transmission control parameters include a power control parameter for uplink transmissions via a millimeter wave frequency band to the second wireless device, and wherein the power control parameter is determined based at least in part on the indicated quantity number of antenna elements in the first set of antenna elements.

15. The apparatus of claim 14, wherein:
the one or more transmission control parameters include a modulation and coding scheme (MCS)-dependent phase compensation parameter for downlink transmissions received from the second wireless device via the millimeter wave frequency band; and
the MCS-dependent phase compensation parameter is determined based on the indicated quantity of antenna elements.

16. The apparatus of claim 14, the one or more processors configured to cause the apparatus to:
receive, from the second wireless device, an indication to configure a digital beamforming codebook that is to be used for the communications with the second wireless device, wherein one or more parameters associated with the digital beamforming codebook are determined based on the indicated quantity of antenna elements.

17. The apparatus of claim 14, the one or more processors configured to cause the apparatus to:
measure one or more training signals received from the second wireless device through use of two or more different sets of antennas;
transmit a measurement report to the second wireless device that indicates the first set of antenna elements; and
receive an indication from the second wireless device that the first set of antenna elements is to be used for the communications with the second wireless device.

18. The apparatus of claim 17, wherein the measurement report is transmitted to the second wireless device via radio resource control (RRC) signaling.

19. The apparatus of claim 14, wherein the one or more transmission control parameters are determined based at least in part on a mapping between the indicated quantity of antenna elements and associated transmission control parameters.

20. The apparatus of claim 14, wherein the first wireless device is a user equipment (UE) or a customer premises equipment (CPE) in a wireless communications system and the second wireless device is a base station, a CPE, a relay device, a router, a repeater, or an integrated access and backhaul (IAB) node in the wireless communications system.

21. The apparatus of claim 14, wherein the apparatus comprises a set of antennas.

22. An apparatus for wireless communication at a second wireless device, comprising:
one or more processors; and
one or more memories coupled with the one or more processors, the one or more processors configured to cause the second wireless device to:
transmit two or more training signals to a first wireless device as part of a beam training procedure for the first wireless device;
receive, from the first wireless device, an indication of a first set of antenna elements and one or more transmission control parameters that correspond to an indicated quantity of antenna elements in the first set of antenna elements; and
transmit control information that indicates digital beamforming codebook parameters to the first wireless device, wherein the digital beamforming codebook parameters configure a digital beamforming codebook that is to be used for communications with the second wireless device, the digital beamforming codebook parameters determined based at least in part on a correspondence between the one or more transmission control parameters and the indicated quantity of antenna elements in the first set of antenna elements.

23. The apparatus of claim 22, the one or more processors configured to cause the second wireless device to:
receive, from the first wireless device, a power control parameter for uplink transmissions from the first wireless device that is associated with the one or more transmission control parameters that correspond to the indicated quantity of antenna elements; and
receive the uplink transmissions from the first wireless device based at least in part on one or more receive parameters, the one or more receive parameters based at least in part on the power control parameter.

24. The apparatus of claim 23, wherein the one or more receive parameters are determined based at least in part on a mapping between the indicated quantity of antenna elements and associated receive parameters.

25. The apparatus of claim 22, wherein:
the indication of the first set of antenna elements is received with a measurement report from the first wireless device, and
the digital beamforming codebook parameters are determined further based at least in part on the measurement report.

26. The apparatus of claim 25, wherein the measurement report is received from the first wireless device via radio resource control (RRC) signaling.

27. The apparatus of claim 22, wherein the first wireless device is a user equipment (UE) or a customer premises equipment (CPE) in a wireless communications system and the second wireless device is a base station, a CPE, a relay device, a router, a repeater, or an integrated access and backhaul (IAB) node in the wireless communications system.

28. The apparatus of claim 22, wherein the second wireless device comprises one or more of an antenna array, an antenna element, or an antenna subarray.

29. An apparatus for wireless communications, comprising:
means for receiving, at a first wireless device, signaling indicating a first set of antenna elements for communications with a second wireless device and indicating one or more transmission control parameters corresponding to an indicated quantity of antenna elements in the first set of antenna elements, the first set of antenna elements including one or more of a plurality of antenna elements of the first wireless device; and
means for communicating with the second wireless device, using the first set of antenna elements, based at least in part on the one or more transmission control parameters, wherein the one or more transmission control parameters include a power control parameter for uplink transmissions via a millimeter wave frequency band to the second wireless device, and wherein the power control parameter is determined based at least in part on the indicated quantity of antenna elements in the first set of antenna elements.

30. The apparatus of claim 29, wherein:
the one or more transmission control parameters include a modulation and coding scheme (MCS)-dependent phase compensation parameter for downlink transmissions received from the second wireless device via the millimeter wave frequency band; and
the MCS-dependent phase compensation parameter is determined based on the indicated quantity of antenna elements.

31. The apparatus of claim 29, further comprising:
means for receiving, from the second wireless device, an indication to configure a digital beamforming codebook that is to be used for the communications with the second wireless device, wherein one or more parameters associated with the digital beamforming codebook are determined based on the indicated quantity of antenna elements.

32. An apparatus for wireless communication at a second wireless device, comprising:
means for transmitting two or more training signals to a first wireless device as part of a beam training procedure for the first wireless device;
means for receiving, from the first wireless device, an indication of a first set of antenna elements and one or more transmission control parameters corresponding to an indicated quantity of antenna elements in the first set of antenna elements; and
means for transmitting control information that indicates digital beamforming codebook parameters to the first wireless device, the digital beamforming codebook parameters configuring a digital beamforming codebook that is to be used for communications with the second wireless device, the digital beamforming codebook parameters determined based at least in part on the one or more transmission control parameters corresponding to the indicated quantity of antenna elements in the first set of antenna elements.

33. The apparatus of claim 32, further comprising:
means for receiving, from the first wireless device, a power control parameter for uplink transmissions from the first wireless device that is associated with the one or more transmission control parameters corresponding to the indicated quantity of antenna elements; and
means for receiving the uplink transmissions from the first wireless device based at least in part on one or more receive parameters, the one or more receive parameters based at least in part on the power control parameter.

34. The apparatus of claim 33, wherein the one or more receive parameters are determined based at least in part on a mapping between the indicated quantity of antenna elements and associated receive parameters.

35. A non-transitory computer-readable medium storing code for wireless communications, the code comprising instructions executable by one or more processors to:
receive, at a first wireless device, signaling indicating a first set of antenna elements for communications with a second wireless device and indicating one or more transmission control parameters corresponding to an indicated quantity of antenna elements in the first set of antenna elements, the first set of antenna elements including one or more of a plurality of antenna elements of the first wireless device; and
communicate with the second wireless device, using the first set of antenna elements, based at least in part on the one or more transmission control parameters, the one or more transmission control parameters including a power control parameter for uplink transmissions via a millimeter wave frequency band to the second wireless device, and the power control parameter being determined based at least in part on the indicated quantity of antenna elements in the first set of antenna elements.

36. The non-transitory computer-readable medium of claim 35, wherein:
the one or more transmission control parameters include a modulation and coding scheme (MCS)-dependent phase compensation parameter for downlink transmissions received from the second wireless device via the millimeter wave frequency band; and
the MCS-dependent phase compensation parameter is determined based on the indicated quantity of antenna elements.

37. The non-transitory computer-readable medium of claim 35, the instructions further executable by the one or more processors to:
receive, from the second wireless device, an indication to configure a digital beamforming codebook that is to be used for the communications with the second wireless device, wherein one or more parameters associated with the digital beamforming codebook are determined based on the indicated quantity of antenna elements.

38. A non-transitory computer-readable medium storing code for wireless communication at a second wireless device, the code comprising instructions executable by one or more processors to:
transmit two or more training signals to a first wireless device as part of a beam training procedure for the first wireless device;
receive, from the first wireless device, an indication of a first set of antenna elements and one or more transmission control parameters corresponding to an indicated quantity of antenna elements in the first set of antenna elements; and
transmit control information that indicates digital beamforming codebook parameters to the first wireless device, the digital beamforming codebook parameters configuring a digital beamforming codebook that is to be used for communications with the second wireless device, the digital beamforming codebook parameters determined based at least in part on the one or more transmission control parameters corresponding to the indicated quantity of antenna elements in the first set of antenna elements.

39. The non-transitory computer-readable medium of claim 38, the instructions further executable by the one or more processors to:
receive, from the first wireless device, a power control parameter for uplink transmissions from the first wireless device that is associated with the one or more transmission control parameters corresponding to the indicated quantity of antenna elements; and
receive the uplink transmissions from the first wireless device based at least in part on one or more receive parameters, the one or more receive parameters based at least in part on the power control parameter.

40. The non-transitory computer-readable medium of claim 39, wherein the one or more receive parameters are determined based at least in part on a mapping between the indicated quantity of antenna elements and associated receive parameters.

* * * * *